US012574892B2

(12) United States Patent
Jiang et al.

(10) Patent No.: US 12,574,892 B2
(45) Date of Patent: Mar. 10, 2026

(54) ONE-TO-MANY AND MANY-TO-MANY RANGING USING NBA-MMS UWB PROTOCOLS

(71) Applicant: Apple Inc., Cupertino, CA (US)

(72) Inventors: Jinjing Jiang, Campbell, CA (US); Robert Golshan, San Francisco, CA (US); Yong Liu, Campbell, CA (US); Alexander Krebs, Munich (DE); Lochan Verma, Danville, CA (US); Xiliang Luo, San Diego, CA (US); Su Khiong Yong, Palo Alto, CA (US)

(73) Assignee: Apple Inc., Cupertino, CA (US)

( * ) Notice: Subject to any disclaimer, the term of this patent is extended or adjusted under 35 U.S.C. 154(b) by 343 days.

(21) Appl. No.: 18/212,550

(22) Filed: Jun. 21, 2023

(65) Prior Publication Data

US 2024/0073856 A1 Feb. 29, 2024

Related U.S. Application Data

(60) Provisional application No. 63/402,409, filed on Aug. 30, 2022.

(51) Int. Cl.
*H04W 64/00* (2009.01)
*H04L 5/00* (2006.01)
*H04W 24/10* (2009.01)

(52) U.S. Cl.
CPC ......... *H04W 64/003* (2013.01); *H04L 5/0048* (2013.01); *H04W 24/10* (2013.01)

(58) Field of Classification Search
CPC .. H04W 64/003; H04W 24/10; H04L 5/0048; G01S 13/876; G01S 13/765
See application file for complete search history.

(56) References Cited

U.S. PATENT DOCUMENTS

| | | | |
|---|---|---|---|
| 11,870,486 B2 * | 1/2024 | Aldana | ................. G01S 13/765 |
| 2020/0355819 A1 * | 11/2020 | Padaki | .................. G01S 13/762 |

(Continued)

FOREIGN PATENT DOCUMENTS

| | | |
|---|---|---|
| EP | 3836573 A1 | 6/2021 |

OTHER PUBLICATIONS

Partial European Search Report directed to related European Application No. 23190849.2, mailed Feb. 6, 2024; 16 pages.

*Primary Examiner* — Siu M Lee
(74) *Attorney, Agent, or Firm* — Sterne, Kessler, Goldstein & Fox P.L.L.C.

(57) ABSTRACT

Embodiments are disclosed for one-to-many and many-to-many ranging using narrowband assisted (NBA)-multi-millisecond (MMS) ultra wideband (UWB) protocols. Some embodiments include an initiator device that communicates with many responder devices. For example, the initiator device can transmit a control/initialization poll message via NB signaling that identifies a ranging cycle, and transmit a first set of MMS segments corresponding to the control/initialization poll message. The initiator device can receive a plurality of report frames from two or more responder devices via NB signaling subsequent to transmitting the first set of MMS segments, and transmit within the ranging cycle, a ranging results report message based at least on the plurality of report frames via narrowband signaling.

20 Claims, 27 Drawing Sheets

(56) References Cited

U.S. PATENT DOCUMENTS

| 2022/0137177 A1* | 5/2022 | Hammerschmidt | .. G01S 13/003 |
| | | | 455/456.1 |
| 2024/0014851 A1* | 1/2024 | So | .......................... G01S 13/765 |
| 2025/0024254 A1* | 1/2025 | Wang | .................... H04W 12/63 |

* cited by examiner

Figure 7:
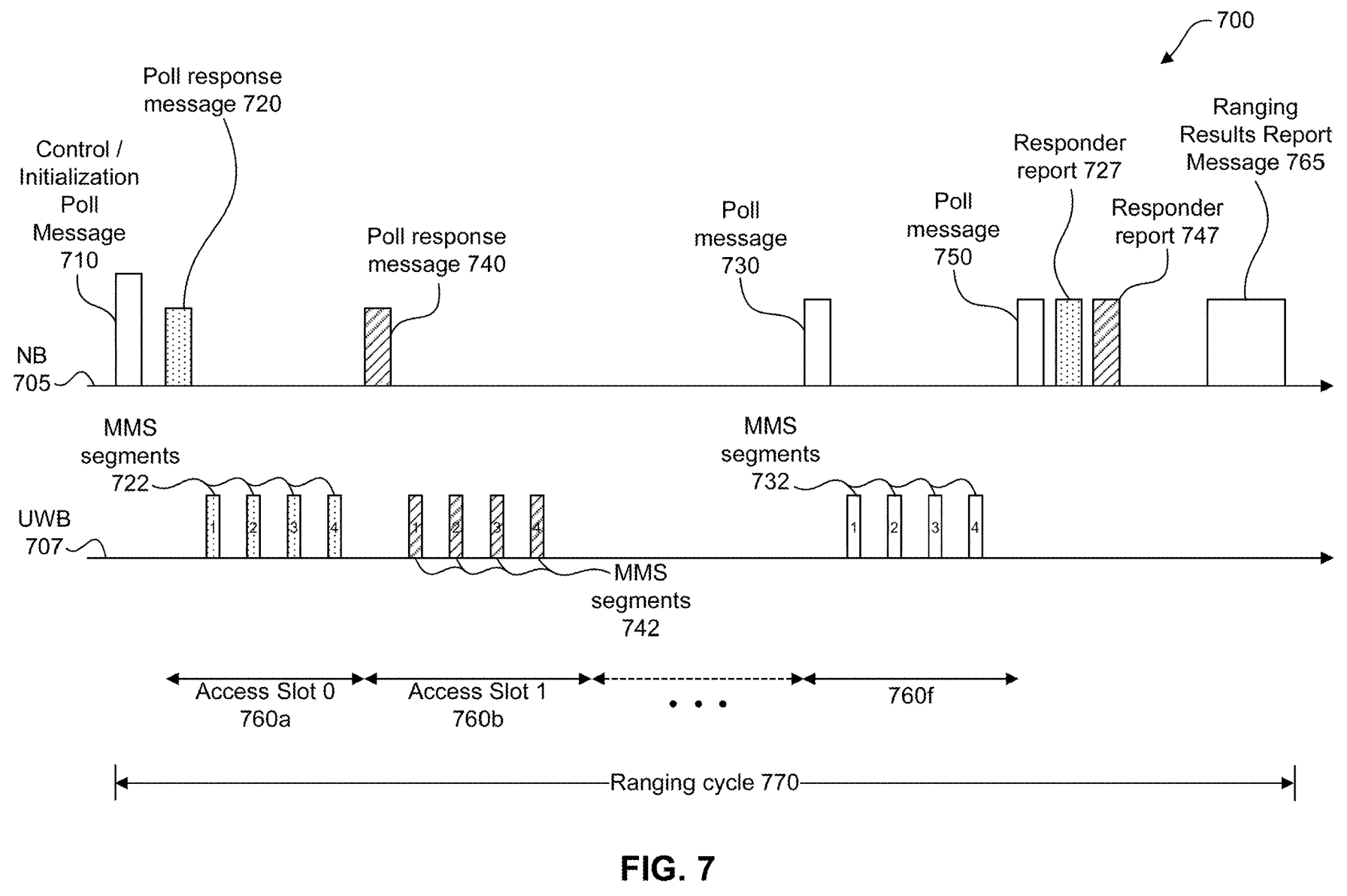

Ranging Results Report Message 765

Responder report 747

Responder report 727

Poll message 750

Poll message 730

MMS segments 732

Poll response message 740

MMS segments 742

Poll response message 720

Control / Initialization Poll Message 710

NB 705

MMS segments 722

UWB 707

Access Slot 0
760a

Access Slot 1
760b

760f

Ranging cycle 770

Computer System 1500

Communication Infrastructure 1506

Processor 1504

Main Memory 1508

User Input/Output Interface(s) 1502

User Input/Output Device(s) 1503

Secondary Memory 1510

Hard Disk Drive 1512

Removable Storage Drive 1514

Removable Storage Unit 1518

Interface 1520

Removable Storage Unit 1522

Communications Interface 1524

Remote device(s), network(s), entity(ies) 1528

Communications Path 1526

1700

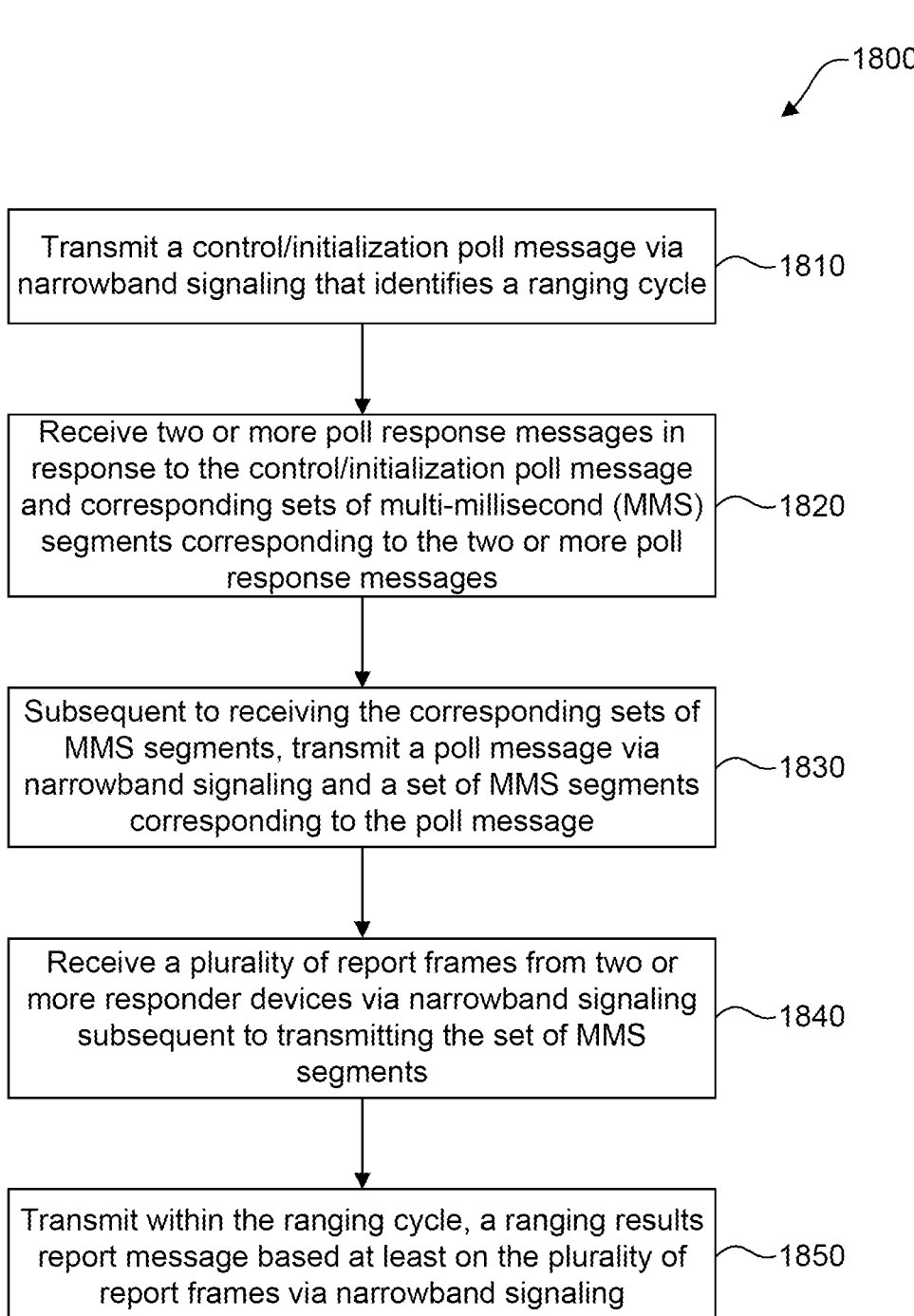

1800

Transmit a control/initialization poll message via narrowband signaling that identifies a ranging cycle ~1810

Receive two or more poll response messages in response to the control/initialization poll message and corresponding sets of multi-millisecond (MMS) segments corresponding to the two or more poll response messages ~1820

Subsequent to receiving the corresponding sets of MMS segments, transmit a poll message via narrowband signaling and a set of MMS segments corresponding to the poll message ~1830

Receive a plurality of report frames from two or more responder devices via narrowband signaling subsequent to transmitting the set of MMS segments ~1840

Transmit within the ranging cycle, a ranging results report message based at least on the plurality of report frames via narrowband signaling ~1850

FIG. 18

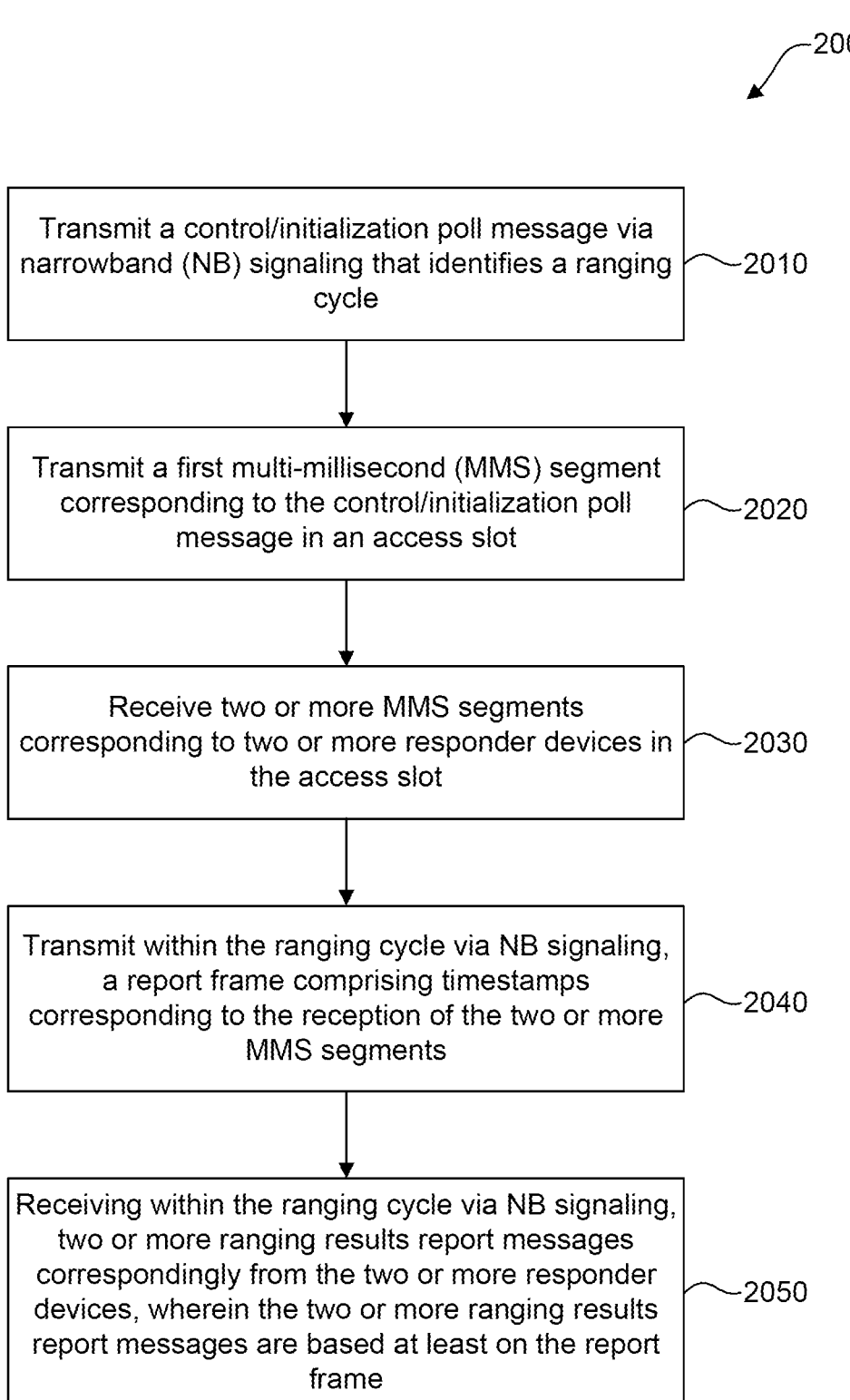

2000

Transmit a control/initialization poll message via narrowband (NB) signaling that identifies a ranging cycle ⟩⎯2010

Transmit a first multi-millisecond (MMS) segment corresponding to the control/initialization poll message in an access slot ⟩⎯2020

Receive two or more MMS segments corresponding to two or more responder devices in the access slot ⟩⎯2030

Transmit within the ranging cycle via NB signaling, a report frame comprising timestamps corresponding to the reception of the two or more MMS segments ⟩⎯2040

Receiving within the ranging cycle via NB signaling, two or more ranging results report messages correspondingly from the two or more responder devices, wherein the two or more ranging results report messages are based at least on the report frame ⟩⎯2050

FIG. 20

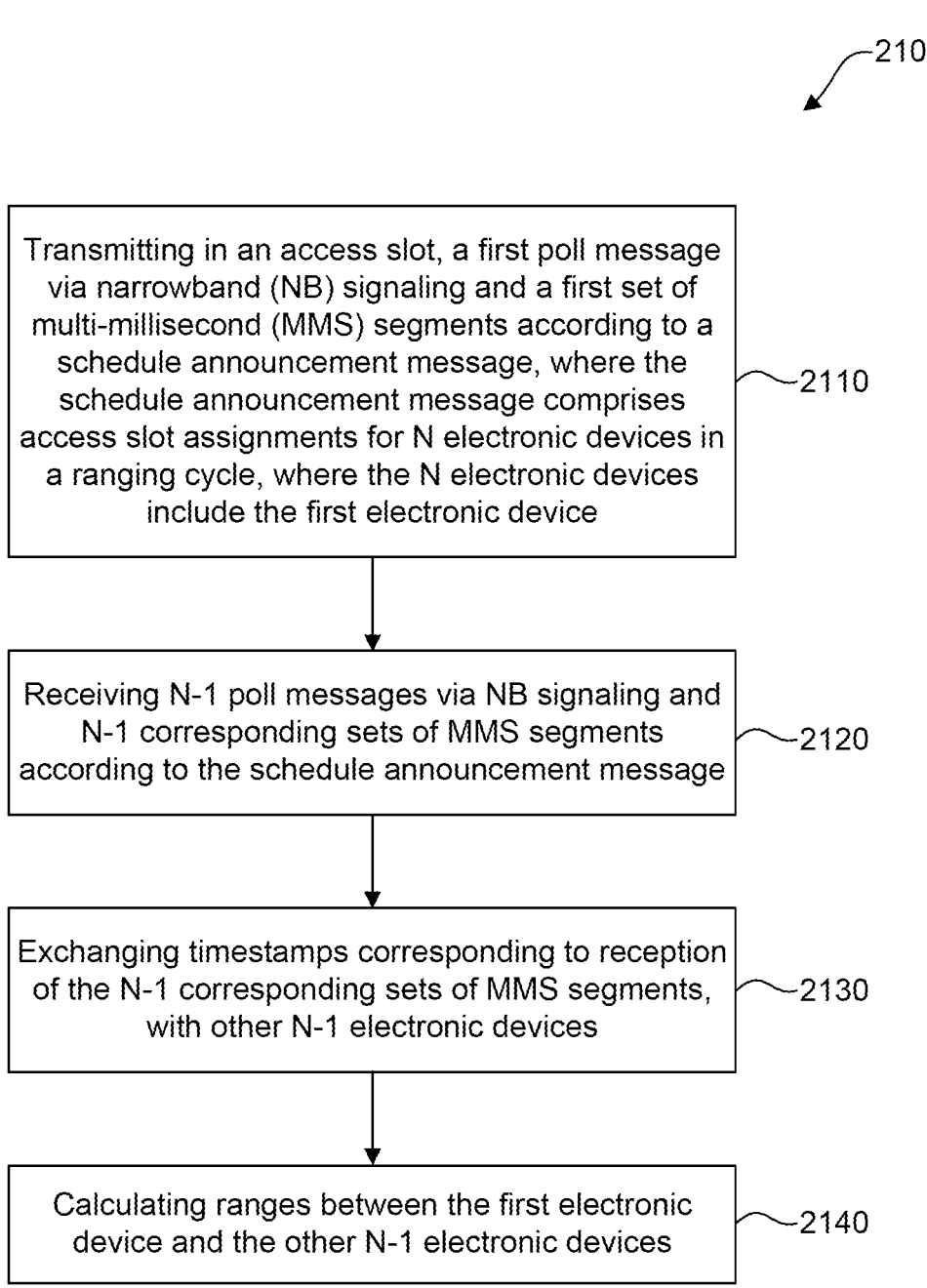

2100

Transmitting in an access slot, a first poll message via narrowband (NB) signaling and a first set of multi-millisecond (MMS) segments according to a schedule announcement message, where the schedule announcement message comprises access slot assignments for N electronic devices in a ranging cycle, where the N electronic devices include the first electronic device — 2110

Receiving N-1 poll messages via NB signaling and N-1 corresponding sets of MMS segments according to the schedule announcement message — 2120

Exchanging timestamps corresponding to reception of the N-1 corresponding sets of MMS segments, with other N-1 electronic devices — 2130

Calculating ranges between the first electronic device and the other N-1 electronic devices — 2140

FIG. 21

ONE-TO-MANY AND MANY-TO-MANY RANGING USING NBA-MMS UWB PROTOCOLS

CROSS-REFERENCE TO RELATED APPLICATIONS

This application claims benefit of U.S. Provisional Application No. 63/402,409, filed on Aug. 30, 2022, entitled, One-to-Many and Many-to-Many Ranging Using NBA-MMS UWB Protocols, which is incorporated herein by reference in its entirety.

BACKGROUND

Field

The embodiments relate generally to wireless devices that perform ranging in a wireless communication system.

Related Art

Ranging is defined in IEEE Std 802.15.4z™-2020 (Amendment to IEEE Std 802.15.4™-2020), Draft IEEE Standard for Low-Rate Wireless Networks, Amendment 1: Enhanced Ultra Wideband (UWB) Physical Layers (PHYs) and Associated Ranging Techniques "IEEE Std 802.15.4z-2020 Amendment."

SUMMARY

Some embodiments include an apparatus, method, and computer program product for one-to-many and many-to-many ranging using narrowband assisted (NBA) multi-millisecond (MMS) ultra wideband (UWB) protocols in a wireless network. Some embodiments include an initiator device that communicates with many responder devices. For example, the initiator device can transmit a control/initialization poll message via narrowband (NB) signaling that identifies a ranging cycle, and transmit a first set of MMS segments corresponding to the control/initialization poll message. The initiator device can receive a plurality of report frames from two or more responder devices via NB signaling subsequent to transmitting the first set of MMS segments, and transmit within the ranging cycle, a ranging results report message based at least on the plurality of report frames via narrowband signaling.

In some embodiments, when the initiator device schedules communications with responder devices, the control/initialization poll message includes an identity of the two or more responder devices and corresponding access slot configurations. When the initiator device implements adaptive access slot configurations, the corresponding access slot configurations can include a first access slot and a second access slot of different lengths. In some embodiments when the initiator device utilizes contention-based access, the control/initiation poll message includes a plurality of access slots and corresponding durations.

In some embodiments, to receive the plurality of report frames, the initiator device can receive in a first access slot via narrowband signaling, a first report frame of the plurality of report frames from a first responder device of the two or more responder devices. When implementing concatenated one-to-one ranging, the initiator device can transmit a poll message in a second access slot via narrowband signaling, transmit a second set of MMS segments corresponding to the poll message, and receive in the second access slot via narrowband signaling, a second report frame of the plurality of report frames from a second responder device of the two or more responder devices, in response to the second set of MMS segments.

In some embodiments, when implementing partially interleaved MMS segments, the initiator device can receive in a second access slot via NB signaling, a second report frame of the plurality of report frames from a second responder device of the two or more responder devices, prior to receiving an MMS segment from the second responder device. In some embodiments, when implementing deferred measurement reports, the first set of MMS segments are transmitted in a first access slot. The initiator device can transmit a poll message in a second access slot via narrowband signaling, and transmit a second set of MMS segments corresponding to the poll message in the second access slot, where the plurality of report frames are received after the first and the second access slots. Further, the initiator device can switch the transmission order of a poll response message received and a poll message transmitted. For example, the initiator device can receive a poll response message in response to the control/initialization poll message prior to transmitting the poll message, and receive a third MMS segment corresponding to the poll response message prior to transmitting the second set of MMS segments.

In some embodiments, the initiator device can use NBA MMS UWB protocols to replace legacy frames, implement adaptive access slots, or double-sided two-way ranging (DS-TWR). For example, when the control/initialization poll message is transmitted in the first access slot, to receive the plurality of report frames, the initiator device can receive in a second access slot, a first report frame of the plurality of report frames from a first responder device of the two or more responder devices, prior to receiving an MMS segment from the first responder device. The initiator device can receive in a third access slot, a second report frame of the plurality of report frames from a second responder device of the two or more responder devices, prior to receiving an MMS segment from the second responder device. When adaptive access slots are scheduled, a number of MMS segments received from the first responder device is different than a number of MMS segments received from the second responder device. When a first DS-TWR is implemented, the initiator device can transmit a poll message subsequent to receiving the MMS segment from the second responder device, and transmit a second set of MMS segments corresponding to the poll message. When a second DS-TWR is implemented, the initiator device can transmit a poll message subsequent to transmitting the first set of MMS segments and prior to receiving the plurality of report frames.

When implementing partially interleaved MMS segments to transmit the first set of MMS segments, the initiator device can transmit a first MMS segment of the first set of MMS segments in a first access slot, and receive a second MMS segment from a first responder device of the two or more responder devices in the first access slot. The initiator device can then receive a third MMS segment from a second responder device of the two or more responder devices in the second access slot, where timestamps of the reception of the second and third MMS segments are used in ranging calculations for the ranging results report message.

In some embodiments, an initiator device can poll via NB signaling and subsequently transmit MMS segments after receiving MMS segments from response devices. For example, an initiator device can transmit a control/initialization poll message via narrowband signaling that identifies a ranging cycle, and receive two or more poll response messages in response to the control/initialization poll message and corresponding sets of MMS segments corresponding to the two or more poll response messages. Subsequent to receiving the corresponding sets of MMS segments, the initiator device can transmit a poll message via narrowband signaling and a set of MMS segments corresponding to the poll message. The initiator device can receive a plurality of report frames from two or more responder devices via narrowband signaling subsequent to transmitting the set of MMS segments, and transmit within the ranging cycle, a ranging results report message based at least on the plurality of report frames via narrowband signaling.

In some embodiments there may be many initiator devices to one responder device. In some examples, an initiator device can transmit a control/initialization poll message via NB signaling that identifies a ranging cycle, and transmit a first MMS segment corresponding to the control/initialization poll message in an access slot. The initiator device can receive two or more MMS segments corresponding to two or more responder devices in the access slot, and transmit within the ranging cycle via NB signaling, a report frame including timestamps corresponding to the reception of the two or more MMS segments. The responder device can receive within the ranging cycle via NB signaling, two or more ranging results report messages correspondingly from the two or more responder devices, wherein the two or more ranging results report messages are based at least on the report frame.

In some embodiments, there may be multiple electronic devices that coordinate ranging among themselves. For example, an electronic device can perform dual roles (e.g., initiator and responder roles) when the multiple electronic devices coordinate ranging. For example, a first electronic device can perform operations including transmitting in an access slot, a first poll message via NB signaling and a first set of MMS segments according to a schedule announcement message, where the schedule announcement message includes access slot assignments for N electronic devices in a ranging cycle, and where the N electronic devices include the first electronic device. The first electronic device operations can include receiving N−1 poll messages via NB signaling and N−1 corresponding sets of MMS segments according to the schedule announcement message, and exchanging timestamps corresponding to reception of the N−1 corresponding sets of MMS segments, with other N−1 electronic devices. The first electronic device operations can include calculating ranges between the first electronic device and the other N−1 electronic devices.

In some embodiments, multiple independent initiator devices with corresponding responder devices, are in proximity. Some embodiments utilize NBA-MMS UWB protocols to enable the initiator devices to perform ranging with corresponding responder devices independently from other initiator devices. A first initiator device can receive a NB advertisement control message from a second initiator device comprising a mini-slot reuse bitmap corresponding to a ranging cycle, and select a transmission mini-slot and a corresponding reception mini-slot in the mini-slot reuse bitmap. The first initiator device can transmit a first MMS segment in the transmission mini-slot, receive a second MMS segment in the reception mini-slot from a first responder device related to the first initiator device, and perform ranging with the first responder device based at least on the first and the second MMS segments. In some embodiments, the first initiator device can update the mini-slot reuse bitmap to reflect the selection of the transmission mini-slot and the corresponding reception mini-slot, and transmit an updated NB advertisement control message including the mini-slot reuse bitmap after the updating.

In some embodiments the multiple independent initiator devices use a same NB channel. For example, when first initiator device and the second initiator device utilize a same NB channel, the first initiator device can transmit a first NB poll message subsequent to an NB poll message transmitted by the second initiator device. Further, a number of MMS segment exchanges of the first initiator device is less than a maximum number of MMS segment exchanges of the second initiator device.

In some embodiments, the multiple independent initiator devices use different NB channels. For example, when an orthogonal hopping sequence is employed in the ranging cycle, the first initiator device can transmit a first NB poll message of the first initiator device on a different NB channel used by the second initiator device. In some embodiments, a number of MMS segment exchanges of the first initiator device is independent of a maximum number of MMS segment exchanges of the second initiator device. Further, the first initiator device can determine from the NB advertisement control message that the second initiator device utilizes a first NB channel, and select a second NB channel, $c_{i+k}$, for transmitting the first NB poll message. The first initiator device can transmit an updated NB advertisement control message comprising an offset bit map that indicates the first NB channel, $c_i$ and the second NB channel, $c_{i+k}$.

BRIEF DESCRIPTION OF THE FIGURES

The accompanying drawings, which are incorporated herein and form part of the specification, illustrate the presented disclosure and, together with the description, further serve to explain the principles of the disclosure and enable a person of skill in the relevant art(s) to make and use the disclosure.

FIG. 5B illustrates an example of one-to-many ranging using NBA-MMS UWB protocols with adaptive access slot size, according to some embodiments of the disclosure.

FIG. 7 illustrates an example of one-to-many ranging using NBA-MMS UWB protocols with polling in NB first and MMS segments later, according to some embodiments of the disclosure.

FIG. 12B illustrates an example of many-to-many ranging with independent initiators using NBA-MMS UWB protocols with NB channel hopping offset, according to some embodiments of the disclosure.

FIG. 18 illustrates an example method for one-to-many ranging using NBA-MMS UWB protocols with polling in NB first and transmitting MMS segments later, according to some embodiments of the disclosure.

FIG. 20 illustrates an example method of many-to-one ranging using NBA-MMS UWB protocols.

FIG. 21 illustrates an example method of many-to-many ranging with coordinated initiators using NBA-MMS UWB protocols with dual roles.

Figure 1A:
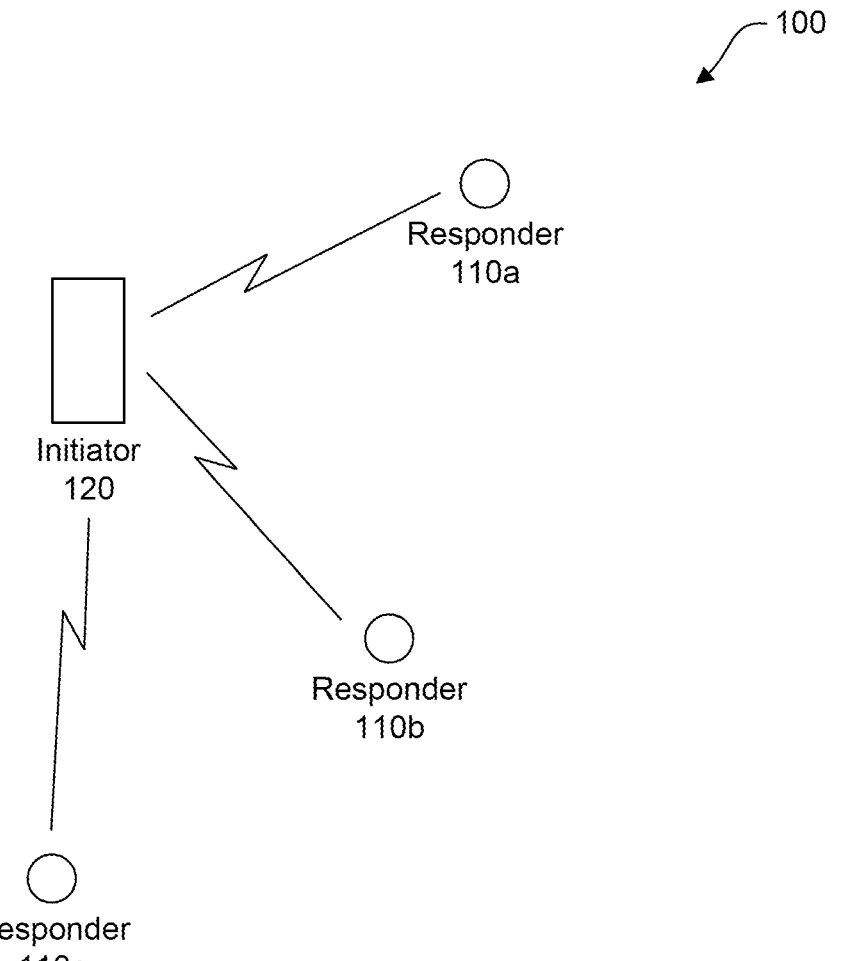
FIGS. 1A-1C illustrate example systems for one-to-many and many-to-many ranging using narrowband assisted (NBA)-multi-millisecond (MMS) ultra wideband (UWB) protocols, in accordance with some embodiments of the disclosure.

The presented disclosure is described with reference to the accompanying drawings. In the drawings, generally, like reference numbers indicate identical or functionally similar elements. Additionally, generally, the left-most digit(s) of a reference number identifies the drawing in which the reference number first appears.

DETAILED DESCRIPTION

Wireless devices can employ short-range wireless applications for many different tasks. For example, a wireless device (e.g., a key fob) may be configured such that when the device comes within a certain proximity of a vehicle (e.g., a car), the doors of the vehicle are automatically unlocked. An initiator device can perform ranging with a responder device in a one-to-one ranging session that occurs in a single ranging cycle in a wireless network. In other words, the initiator device may be able to determine a range and/or position of the initiator device with respect to the responder device. When an initiator device performs ranging with many responder devices the initiator device performs multiple ranging sessions in multiple independent single ranging cycles. The initiator device utilizes power to perform the multiple independent single ranging cycles. In addition, the multiple independent ranging cycles are subject to collisions in the wireless network due to their long duration. Collisions result in a repeated ranging effort and can lead to inefficient use of wireless resources.

Some embodiments utilize narrowband assisted (NBA)-multi-millisecond (MMS) ultra wideband (UWB) protocols to perform one-to-many ranging, many-to-many ranging, and many-to-one ranging with responder devices. The embodiments can utilize shorter ranging cycles than the multiple independent single ranging cycles, and thus reduces power consumption for initiator devices and/or responder devices. In addition, the shorter ranging cycles can reduce the chances of a collision resulting in more efficient use of wireless resources.

Figures 14A, 14B, 14C:
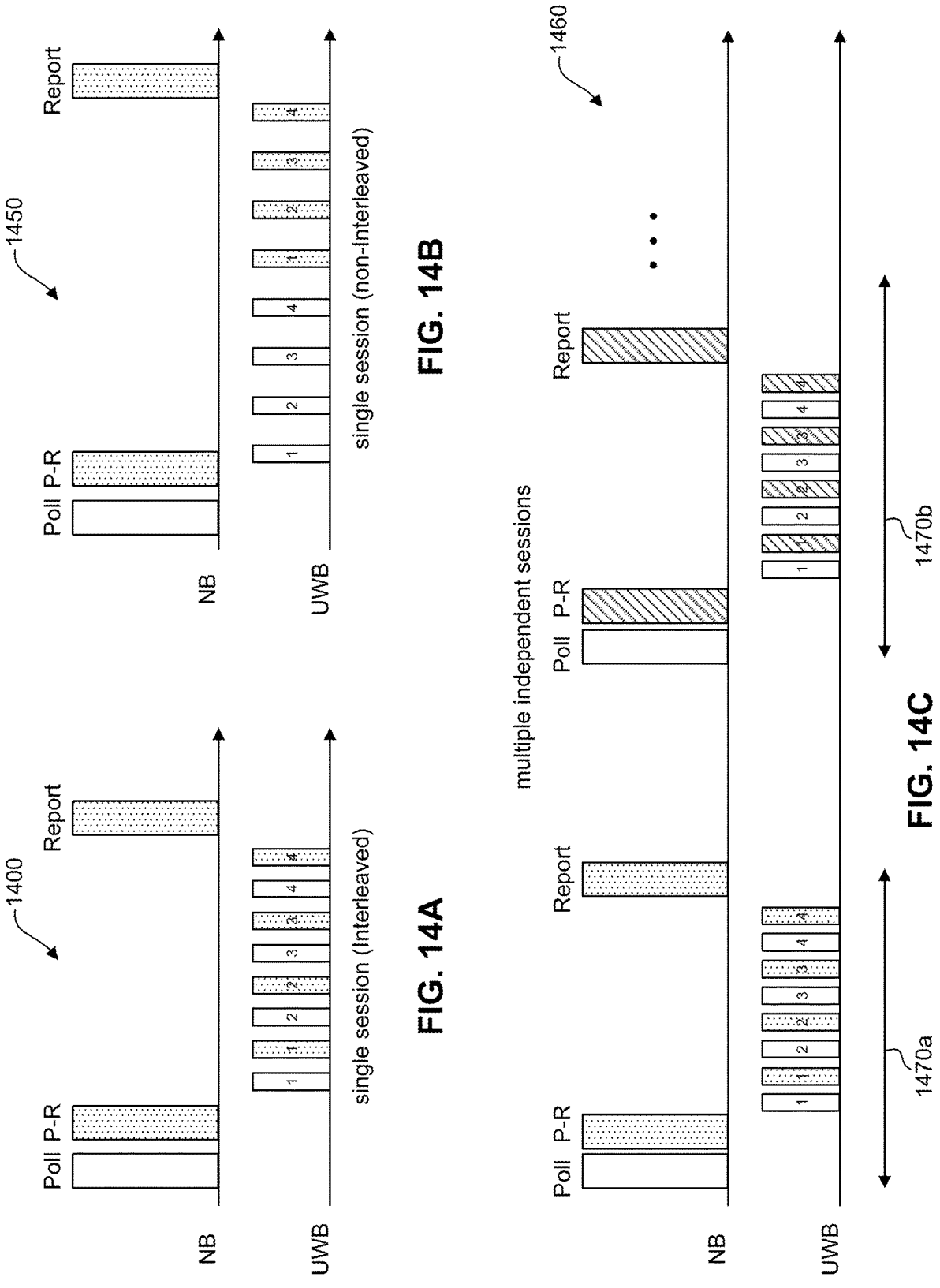
FIGS. 14A-14C illustrate examples of one-to-one ranging using NBA-MMS UWB protocols, according to some embodiments of the disclosure.

FIGS. 14A-14C illustrate examples of one-to-one ranging using NBA-MMS UWB protocols, according to some embodiments of the disclosure. Example 1400 illustrates a single ranging session between one initiator device and one responder device with interleaved MMS segments in a single ranging cycle. Herein, MMS segments may be UWB fragments. Example 1450 illustrates a single ranging session between one initiator device and one responder device with non-interleaved MMS segments in a single ranging cycle. Example 1460 illustrates an initiator device having single ranging sessions with a different responder device per ranging cycle. For example, an initiator device can have a first ranging session with interleaved MMS segments and a first responder device during first ranging cycle 1470*a*, and a second ranging session with interleaved MMS segments with a second responder device during second ranging cycle 1470*b*. The initiator device utilizes power to perform the independent ranging sessions for the duration of first and second ranging cycles 1470*a* and 1470*b*. Further, the long durations of first and second ranging cycles 1470*a* and 1470*b* are exposed to chances for collisions in the wireless network.

Figure 1B:
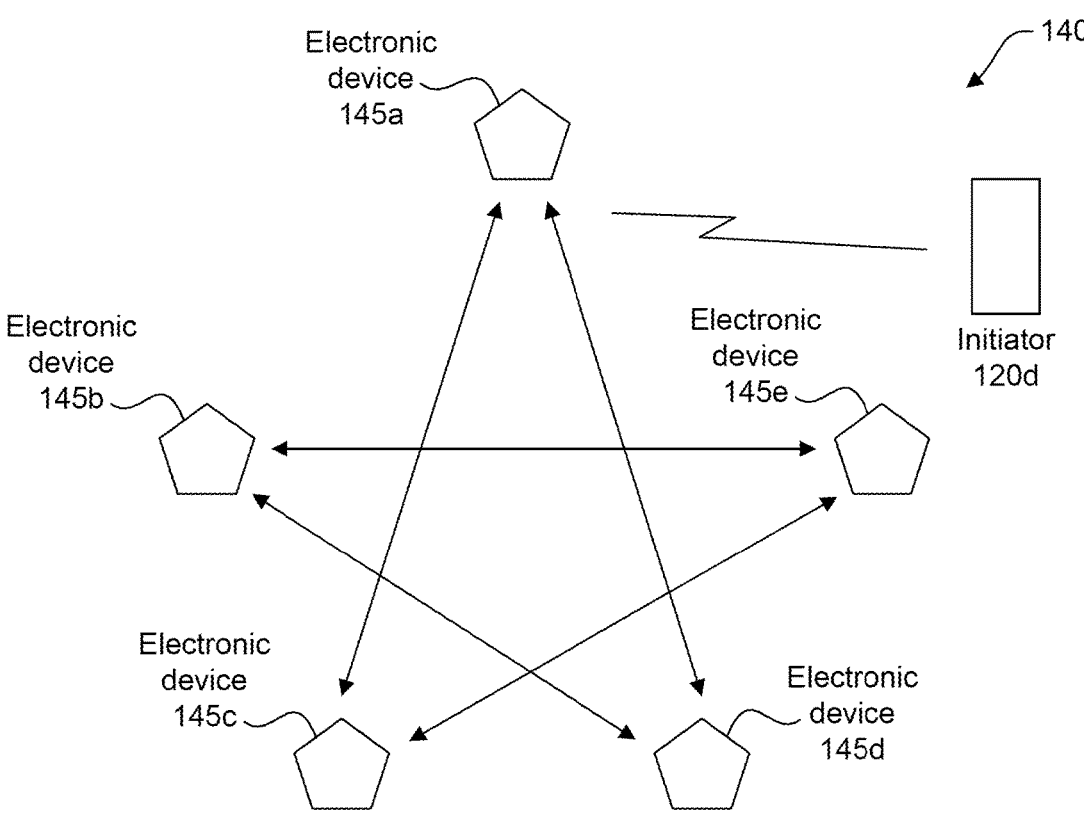
Figure 1C:
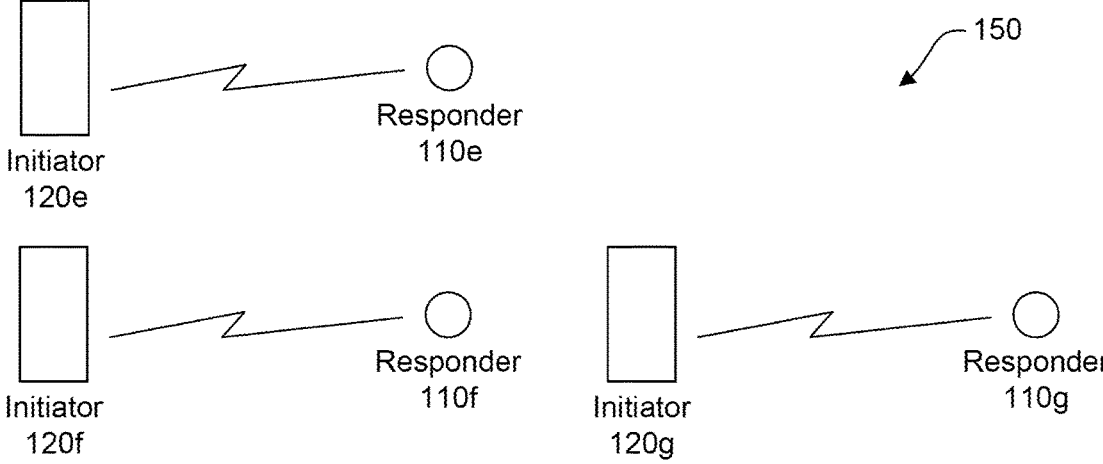
Figure 2:
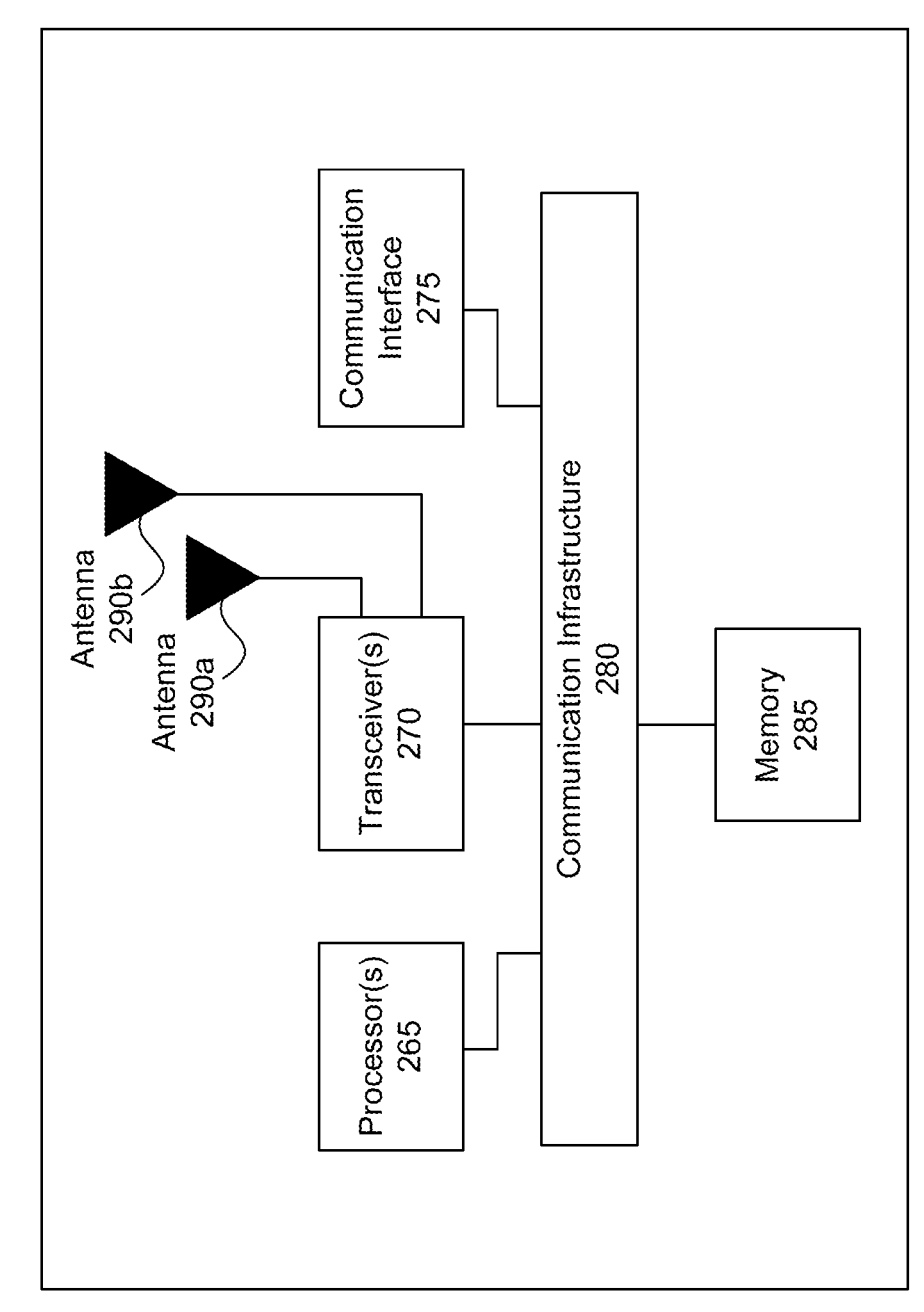
FIG. 2 illustrates a block diagram of an example wireless system supporting one-to-many and many-to-many ranging using NBA-MMS UWB protocols, according to some embodiments of the disclosure.

FIG. 1A-1C illustrate example systems for one-to-many and many-to-many ranging using NBA-MMS UWB protocols, in accordance with some embodiments of the disclosure. Example 100 illustrates one-to-many ranging with initiator device 120 communicating with responder devices 110*a*-110*c*. An initiator device 120 can be but is not limited to a cellular phone, a smart phone, a tablet, a personal digital assistant (PDA), a laptop, or an interrogator device. A responder device 110 can be but is not limited to a wireless speaker, a television set, a display, a door locking/unlocking device, a home appliance (e.g., a thermostat), an internet of things (IoT) device, a tag, a transponder, a cellular phone, a smart phone, a tablet, a PDA, a desktop computer, a tablet computer, or a laptop. Example 140 illustrates many-to-many ranging with coordination that include electronic devices 145a-145e that schedule ranging efforts. Electronic devices 145a-145e may be anchor devices inside a building (e.g., a mall.) Initiator device 120d, for example, can perform ranging with one or more electronic devices 145a-145c to determine a relative location within the building. Example 150 illustrates many-to-many ranging with independent initiator devices and corresponding ranging devices in a room (e.g., an office.) For example, initiator device 120e may range with responder device 110e, initiator device 120f may range with responder device 110f, and initiator device 120g may range with responder device 110g, where the ranging activities for initiator devices 120e-120g occur independently (e.g., ranging efforts are not coordinated.) FIG. 2 illustrates a block diagram of example wireless system 200 supporting one-to-many and many-to-many ranging using NBA-MMS UWB protocols, according to some embodiments of the disclosure. For explanation purposes and not a limitation, FIG. 2 may be described with reference to elements from FIGS. 1A-1C. For example, system 200 may be any of the electronic devices (e.g., initiator device 120, initiator device 120d-120g, responder devices 110a-110c, responder devices 110e-110g, or electronic devices 145a-145e) of systems 100, 140, and/or 150. System 200 includes one or more processors 265, transceiver(s) 270, communication interface 275, communication infrastructure 280, memory 285, and antenna 290. Memory 285 may include random access memory (RAM) and/or cache, and may include control logic (e.g., computer instructions) and/or data. One or more processors 265 can execute the instructions stored in memory 285 to perform operations enabling wireless system 200 to transmit and receive wireless communications, including the operations for performing one-to-many and many-to-many ranging using NBA-MMS UWB protocols described herein. In some embodiments, one or more processors 265 can be "hard coded" to perform the functions herein. Communication interface 275 allows system 200 to communicate with other devices that may be wired and/or wireless. Communication infrastructure 280 may be a bus. Transceiver(s) 270 transmits and receives wireless communications signals including wireless communications supporting one-to-many and many-to-many ranging using NBA-MMS UWB protocols according to some embodiments, and may be coupled to one or more antennas 290 (e.g., 290a, 290b). Antennas 290a and/or 290b may include one or more antennas that may be the same or different types. In some embodiments, transceiver 700 can be a hybrid wireless transceiver that includes transceiver 270a (e.g., part of a NB subsystem not shown) coupled to antenna 290a and coupled to transceiver 270b (e.g., part of a UWB subsystem not shown). Transceiver 270b can be coupled to antenna 290b.

Figure 3:
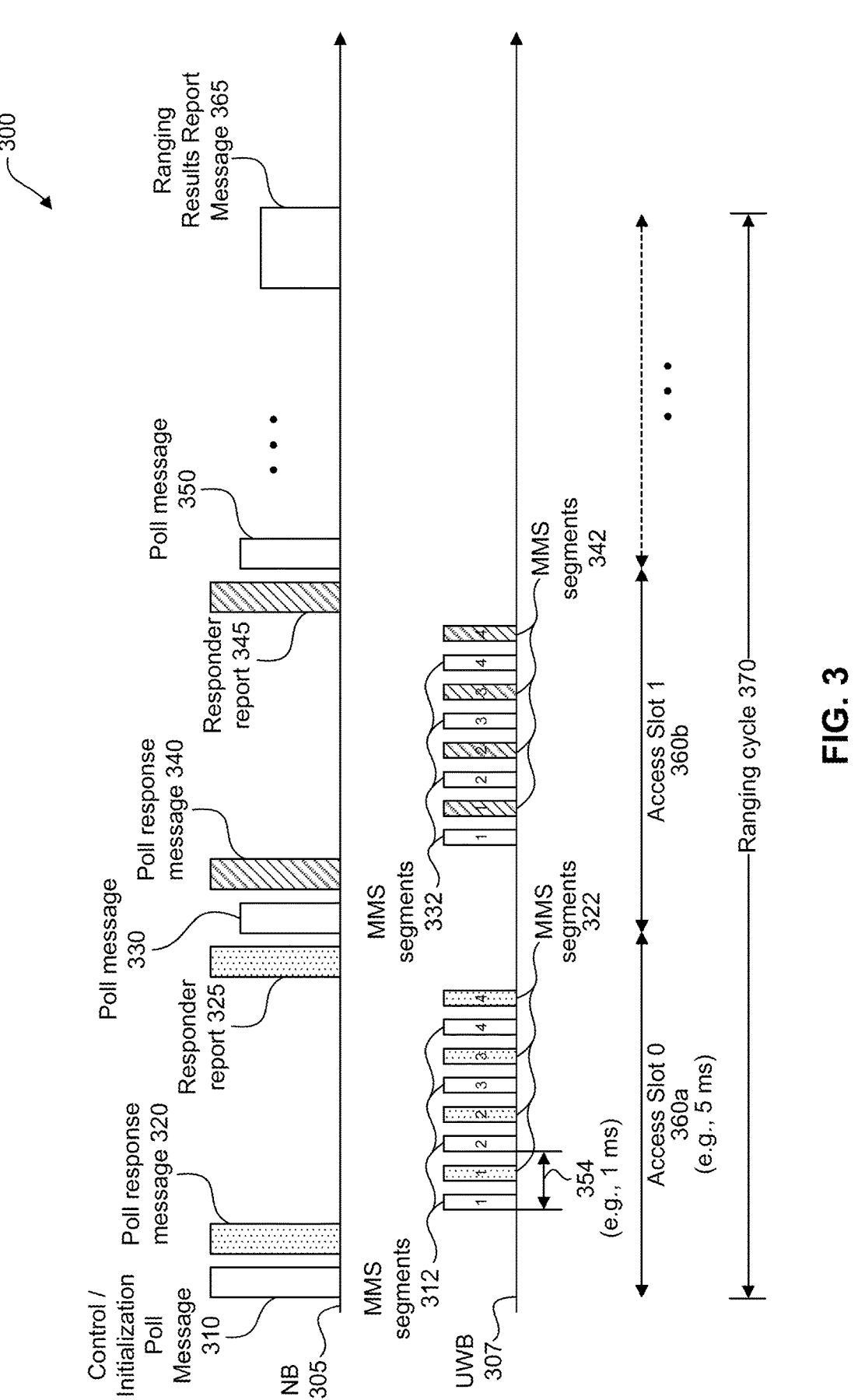
FIG. 3 illustrates an example of one-to-many ranging using NBA-MMS UWB protocols with concatenated one-to-one ranging, according to some embodiments of the disclosure.

FIG. 3 illustrates example 300 of one-to-many ranging using NBA-MMS UWB protocols with concatenated one-to-one ranging, according to some embodiments of the disclosure. For explanation purposes and not a limitation, FIG. 3 may be described with reference to elements from other figures within the disclosure. For example, portions of example 300 can be performed by initiator device 120 and/or responder devices 110a-110c of FIG. 1A, or system 200 of FIG. 2. Example 300 is similar to example 1460 of FIG. 14C, but the multiple interleaved MMS segments occur in various access slots within one ranging cycle (e.g., ranging cycle 370) rather than in separate ranging cycles. In example 300, one-to-many ranging is achieved by ranging with a responder device one at a time in different access slots (e.g., access slot 0 360a ranging with responder device 110a, access slot 1 360b ranging with responder device 110b) within ranging cycle 370.

An access slot can be for example, 5 ms in length. In some embodiments, a control/initialization poll message (e.g., control/initialization poll message 310) can indicate a scheduled ranging mode or a contention-based ranging mode. When initiator device 120 is aware of the responder devices 110a-110c (e.g., based on prior ranging cycle exchanges) initiator device 120 may assign responder devices to access slots. Accordingly, for a scheduled ranging mode, control/initialization poll message 310 can include a list of responder devices and corresponding access slot configurations. When initiator device 120 operates in contention-based ranging mode, control/initialization poll message 310 can include a number of access slots and a corresponding duration.

In example 300, a frame exchange sequence for access slot 0 360a can include initiator device 120 transmitting control/initialization poll message 310 via NB 305 (e.g., via NB signaling), receiving poll response message 320 in response, from a responder device (e.g., responder device 110a) via NB 305, transmitting MMS segments 312 according to control/initialization poll message 310 via UWB 307, and receiving MMS segments 322 according to poll response message 320 via UWB 307, where MMS segments 312 and MMS segments 322 are interleaved. Initiator device 120 can receive in access slot 0 360a via NB 305, responder report 325(e.g., a report frame) from responder device 110a that received MMS segments 312. Responder report 325 can include an identifier such as media access control (MAC) address that identifies responder device 110a as well as timestamps corresponding to received MMS segments of MMS segments 312. As an example, time duration 354 can be of length 1 ms that begins at MMS segment 1 of MMS segments 312, and ends before the start of MMS segment 2.

Control/initiation poll message 310 can include but is not limited to: configuration information regarding ranging cycle 370 (e.g., adaptive access slot configurations for different responder devices 110a-110c for scheduled-mode), and an initial poll message. In some embodiments, control/initialization poll message 310 can be split into two independent messages.

A frame exchange sequence for access slot 1 360b can include initiator device 120 transmitting poll message 330 via NB 305, receiving poll response message 340 in response to poll message 330 from a responder device (e.g., responder device 110b) via NB 305, transmitting MMS segments 332 according to poll message 330 via UWB 307, and receiving MMS segments 342 according to poll response message 340 via UWB 307, where MMS segments 332 and MMS segments 342 are interleaved. Initiator device 120 can receive in access slot 1 360b via NB 305, responder report 345 from responder device 110b that received MMS segments 332. Responder report 345 can include an identifier such as a MAC address that identifies responder device 110b as well as timestamps corresponding to received MMS segments of MMS segments 332. A similar frame exchange sequence for other access slots can include initiator device transmitting poll message 350 in a following access slot.

Prior to the end of ranging cycle 370, initiator device 120 can calculate ranging results corresponding to responder devices 110a, 110b, and/or 110c based on the received corresponding responder reports (e.g., responder report 325, 345, etc.) and transmit ranging results report message 365 via NB 305. Corresponding responder devices 110a, 110b, and/or 110c can receive ranging results report message 365 and use the corresponding ranging results in various ranging applications with initiator device 120.

Figure 4A:
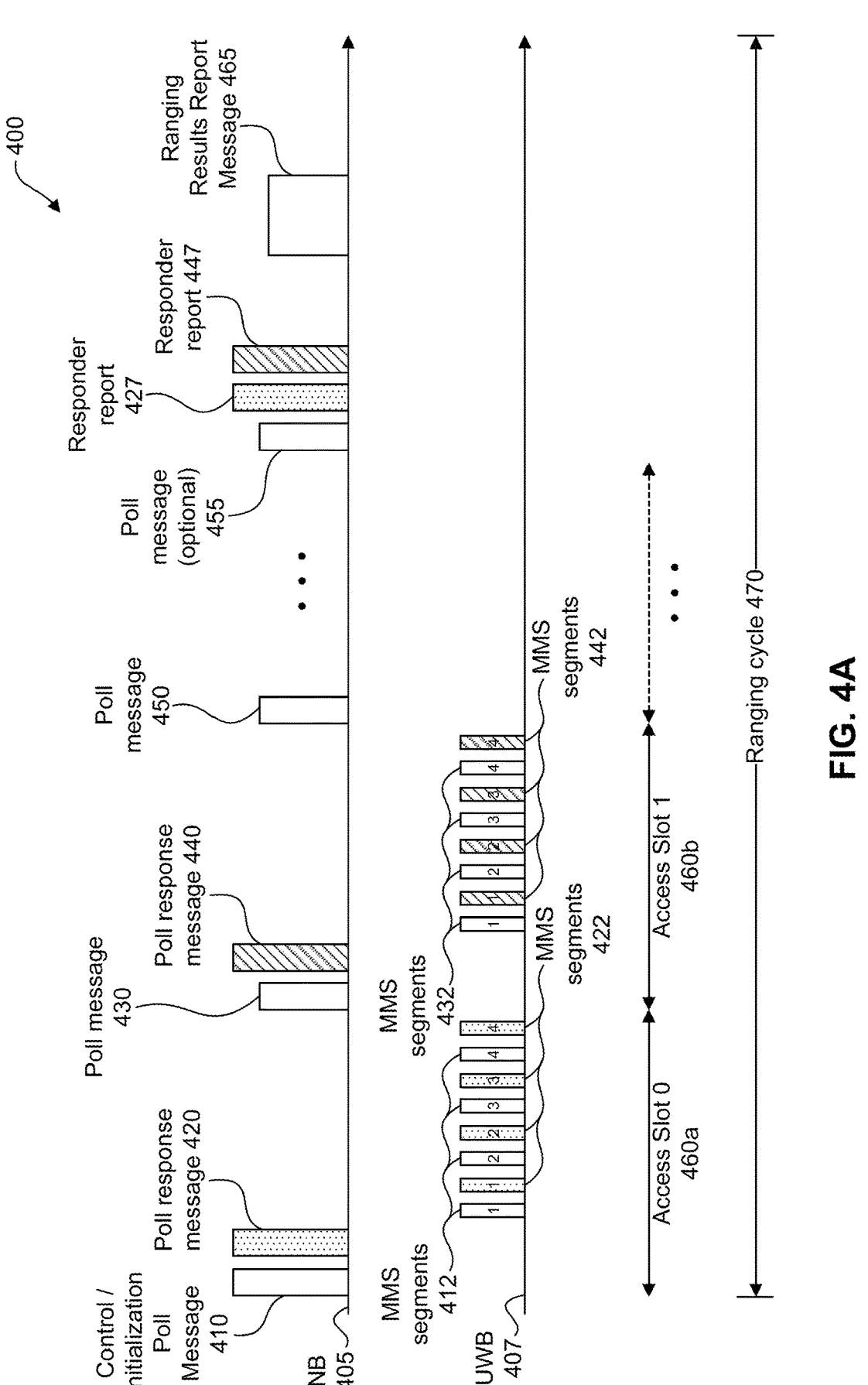
FIG. 4A illustrates an example of one-to-many ranging using NBA-MMS UWB protocols with deferred measurement reports, according to some embodiments of the disclosure.

FIG. 4A illustrates example 400 of one-to-many ranging using NBA-MMS UWB protocols with deferred measurement reports, according to some embodiments of the disclosure. For explanation purposes and not a limitation, FIG. 4A may be described with reference to elements from other figures within the disclosure. For example, portions of example 400 can be performed by initiator device 120 and/or responder devices 110a-110c of FIG. 1A, or system 200 of FIG. 2. In example 400, one-to-many ranging is achieved by ranging with a responder device one at a time in different access slots (e.g., access slot 0 460a ranging with responder device 110a, access slot 1 460b ranging with responder device 110b) and corresponding responder reports (e.g., responder reports 427, 447) are deferred (e.g., transmitted by responder devices 110a, 110b in a later access slot that different from the access slot in which a corresponding poll response message is transmitted.)

Example 400 saves time when responder reports (e.g., measurement reports such as responder report 325 or responder report 345 of FIG. 3 are not be readily available at the end of a MMS segment exchange (e.g., end of access slot 0 360a or access slot 1 360b.) Instead of waiting at the end of each access slot for a responder report, responder reports 427, 447 can be transmitted in a later access slot that is different than the access slot in which a responder device 110's corresponding MMS segments are transmitted. In other words, example 400 shortens the access slot duration at least 2 ms for a second responder device (e.g., responder device 110b) such that the overall duration of ranging cycle 470 is reduced. Accordingly, example 400 reduces power consumption and reduces the chance of collisions.

In example 400, a frame exchange sequence for access slot 0 460a can include initiator device 120 transmitting control/initialization poll message 410 via NB 405, receiving poll response message 420 in response, from a responder device (e.g., responder device 110a) via NB 405, transmitting MMS segments 412 according to control/initialization poll message 410 via UWB 407, and receiving MMS segments 422 according to poll response message 420 via UWB 407, where MMS segments 412 and MMS segments 422 are interleaved. Initiator device 120 does not receive a responder report in access slot 0 460a. Instead, initiator device 120 receives responder report 427 via NB 405 from responder device 110a that received MMS segments 412 in a later access slot that is different than access slot 0 460a. Responder report 427 can include an identifier such as MAC address that identifies responder device 110a as well as timestamps corresponding to received MMS segments of MMS segments 412.

A frame exchange sequence for access slot 1 460b can include initiator device 120 transmitting poll message 430 via NB 405, receiving poll response message 440 in response, from a responder device (e.g., responder device 110b) via NB 405, transmitting MMS segments 432 according to poll message 430 via UWB 407, and receiving MMS segments 442 according to poll response message 440 via UWB 407, where MMS segments 432 and MMS segments 442 are interleaved. Initiator device 120 can receive in an access slot later than access slot 1 460b via NB 405, responder report 447 from responder device 110b that received MMS segments 432. Responder report 447 can include an identifier such as a MAC address that identifies responder device 110b as well as timestamps corresponding to received MMS segments of MMS segments 432. A similar frame exchange sequence for other access slots can include initiator device 120 transmitting poll message 450 in a following access slot (not shown).

Prior to the end of ranging cycle 470, initiator device 120 can transmit an optional poll message 455, receive corresponding responder reports (e.g., responder reports 427, 447), calculate ranging results corresponding to responder devices 110a, 110b, based on the responder reports 427, 447, and transmit ranging results report message 465 via NB 405. Corresponding responder devices 110a, 110b, can receive ranging results report message 465 and use the corresponding ranging results in various ranging applications with initiator device 120.

Figure 4B:
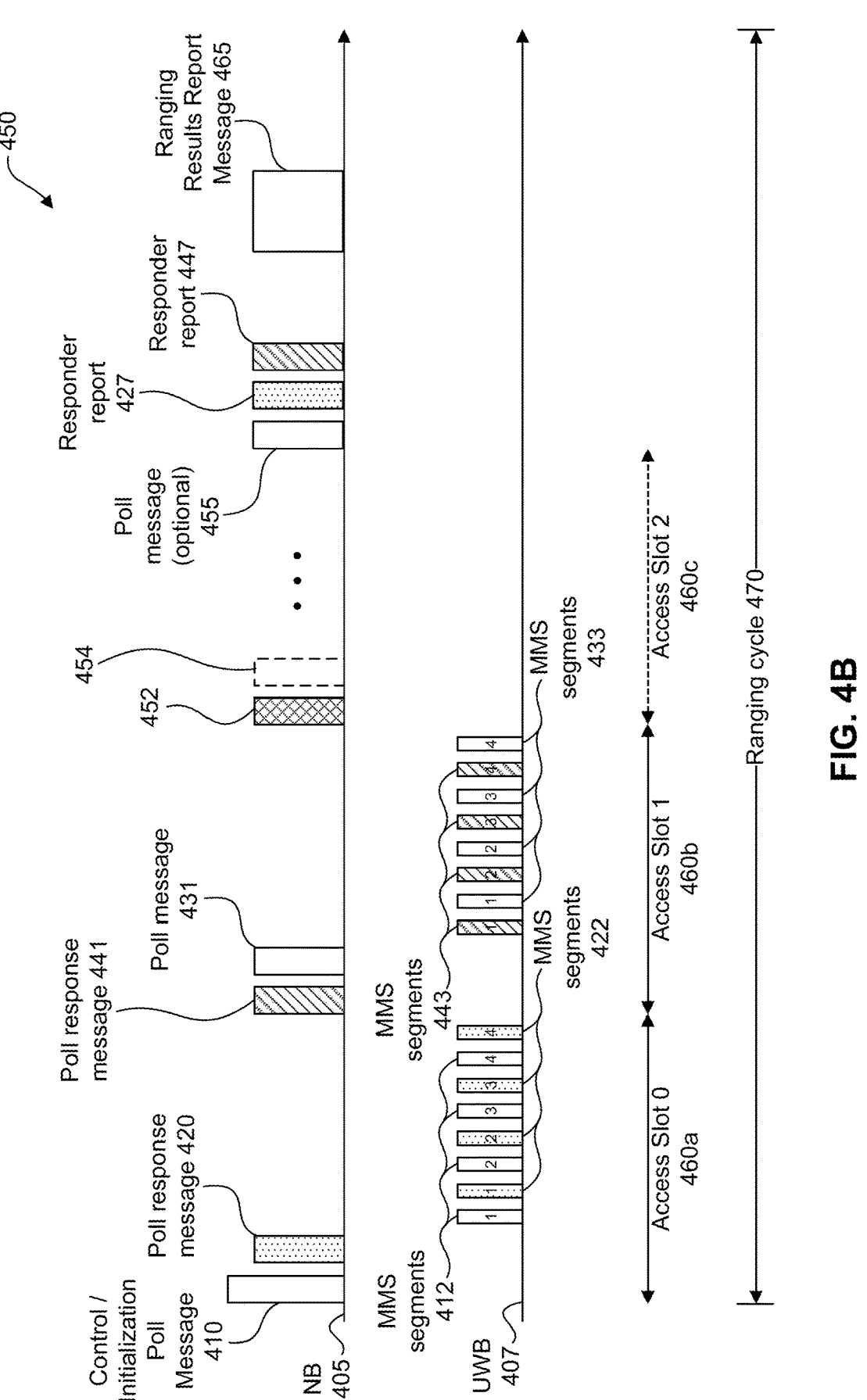
FIG. 4B illustrates an example of one-to-many ranging using NBA-MMS UWB protocols with switched order of transmissions, according to some embodiments of the disclosure.

FIG. 4B illustrates example 450 of one-to-many ranging using NBA-MMS UWB protocols with switched order of transmissions, according to some embodiments of the disclosure. For explanation purposes and not a limitation, FIG. 4B may be described with reference to elements from other figures within the disclosure. For example, portions of example 450 can be performed by initiator device 120 and/or responder devices 110a-110c of FIG. 1A, or system 200 of FIG. 2. In example 450, when initiator device 120 operates in a contention-based ranging mode where responder devices 110a, 110b, 110c randomly select an access slot 460 to range with initiator device 120. If initiator device 120 does not receive or recognize a poll response message from a responder device (e.g., one of responder devices 110a, 110b, 110c), initiator device 120 does not need to transmit a poll message. For example, in access slot 1 460b, responder device 110b can send a NB response frame (e.g., poll response message 441) first, then initiator device 120 responds by transmitting poll message 431 in an NB-frame. In this way, if the initiator device 120 does not receive a correct poll response message from a responder device (e.g., responder device 110b, 110c), initiator device 120 does not need to make a transmission in access slot 1 460b. Thus, initiator device 120 can conserve power.

In example 450, a frame exchange sequence for access slot 0 460a can include initiator device 120 transmitting control/initialization poll message 410 via NB 405, receiving poll response message 420 in response from a responder device (e.g., responder device 110a) via NB 405, transmitting MMS segments 412 according to control/initialization poll message 410 via UWB 407, and receiving MMS segments 422 according to poll response message 420 via UWB 407, where MMS segments 412 and MMS segments 422 are interleaved. Initiator device 120 does not receive responder report 427 in access slot 0 460a. Instead, initiator device 120 receives responder report 427 via NB 405 from responder device 110a based on received MMS segments 412 in a later access slot that is different than access slot 0 460a. Responder report 427 can include an identifier such as a MAC address that identifies responder device 110a as well as timestamps corresponding to received MMS segments of MMS segments 412.

A frame exchange sequence for access slot 1 460b can include initiator device 120 receiving poll response message 441 in response to control/initialization poll message 410, from a responder device (e.g., responder device 110b) via NB 405. Subsequent to receiving poll response message 441, initiator device 120 can transmit poll message 431 via NB 405. Initiator device 120 can receive MMS segments 443 according to poll response message 441 via UWB 407, and transmit MMS segments 433 according to poll message 431 via UWB 407, where MMS segments 433 and MMS segments 443 are interleaved. Initiator device 120 can receive in an access slot later than access slot 1 460*b* via NB 405, responder report 447 from responder device 110*b* based on received MMS segments 433. Responder report 447 can include an identifier such as a MAC address that identifies responder device 110*b* as well as timestamps corresponding to received MMS segments of MMS segments 433. In some embodiments, when a poll response message 452 is not received or recognized by initiator device 120, poll message 454 and the following MMS segments from the initiator are not transmitted.

Prior to the end of ranging cycle 470, initiator device 120 can transmit an optional poll message 455, receive corresponding responder reports (e.g., responder reports 427, 447), calculate ranging results corresponding to responder devices 110*a*, 110*b* based on responder reports 427, 447, and transmit ranging results report message 465 via NB 405. Corresponding responder devices 110*a*, 110*b* can receive ranging results report message 465 and use the corresponding ranging results in various ranging applications with initiator device 120.

Figure 5A:
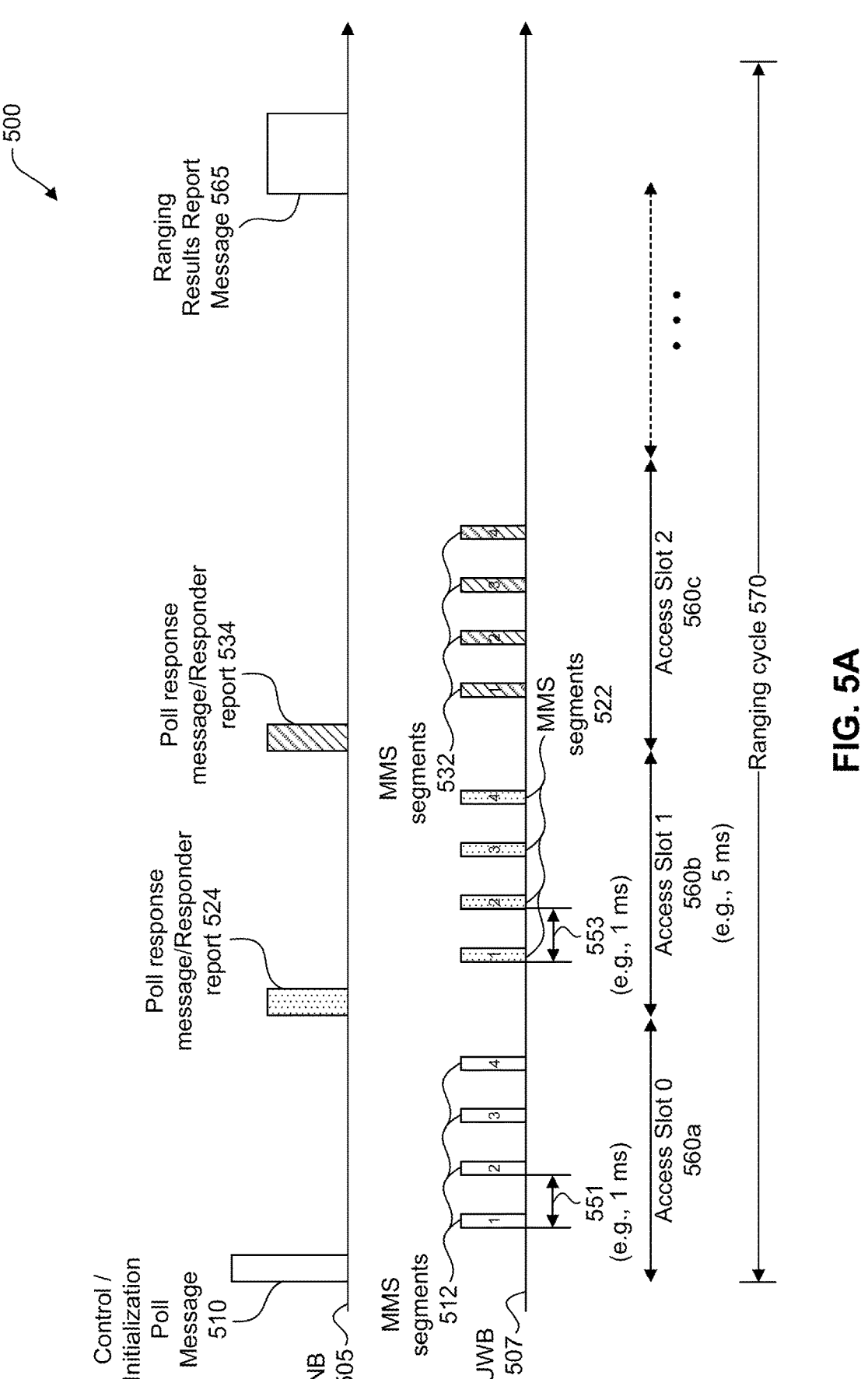
FIG. 5A illustrates an example of one-to-many ranging replacing legacy frames using NBA-MMS UWB protocols, according to some embodiments of the disclosure.

FIG. 5A illustrates example 500 of one-to-many ranging replacing legacy frames using NBA-MMS UWB protocols, according to some embodiments of the disclosure. For explanation purposes and not a limitation, FIG. 5A may be described with reference to elements from other figures within the disclosure. For example, portions of example 500 can be performed by initiator device 120 and/or responder devices 110*a*-110*c* of FIG. 1A, or system 200 of FIG. 2. An access slot can be for example, 5 ms in length (e.g., access slot 1 560*b*.) As an example, time duration 551 of length 1 ms begins at MMS segment 1 and ends at the start of MMS segment 2. Additional time may be reserved in access slot 0 560*a* compared to other access slot durations, to help a responder device (e.g., responder device 110*a*) to prepare a NB response frame (e.g., poll response message/responder report 524.) The reserved time may be at least 2 ms in length. In some embodiments, access slot 0 560*a* may have a longer duration to maintain the reserved time, compared to the length of remaining access slots 560.

In example 500, a frame exchange sequence for access slot 0 560*a* can include initiator device 120 transmitting control/initialization poll message 510 via NB 505 (e.g., via NB signaling), and transmitting MMS segments 512 via UWB 507 according to control/initialization poll message 510. Control/initiation poll message 510 can include but is not limited to: configuration information regarding ranging cycle 570 (e.g., adaptive access slot configurations for different responder devices 110*a*-110*c* for scheduled ranging mode), and an initial poll message. In some embodiments, control/initialization poll message 510 can be split into two independent messages.

A frame exchange sequence for access slot 1 560*b* can include initiator device 120 receiving via NB 505, poll response message/responder report 524 that can include an identifier such as MAC address that identifies responder device 110*a* as well as timestamps corresponding to received MMS segments of MMS segments 512. Responder device 110*a* can transmit MMS segments 522 via UWB 507 corresponding to poll response message/responder report 524. As an example, time duration 553 of length 1 ms begins at MMS segment 1 and ends before the start of MMS segment 2.

A frame exchange sequence for access slot 2 560*c* can include initiator device 120 receiving via NB 505, poll response message/responder report 534 that can include an identifier such as a MAC address that identifies responder device 110*b* as well as timestamps corresponding to received MMS segments of MMS segments 512. Responder device 110*b* can transmit MMS segments 532 via UWB 507 corresponding to poll response message/responder report 534.

Prior to the end of ranging cycle 570, initiator device 120 can calculate ranging results corresponding to responder devices 110*a*, 110*b*, and/or 110*c* based on the received corresponding responder reports (e.g., poll response message/responder report 524, 534, etc.) and transmit ranging results report message 565 via NB 505. Corresponding responder devices 110*a*, 110*b*, and/or 110*c* can receive ranging results report message 565 and use the corresponding ranging results in various ranging applications with initiator device 120. In some embodiments, if a single NB frame cannot accommodate ranging results report message 565, ranging results report message 565 may be split into multiple fragments and transmitted in more than one NB frame.

Figure 5B:
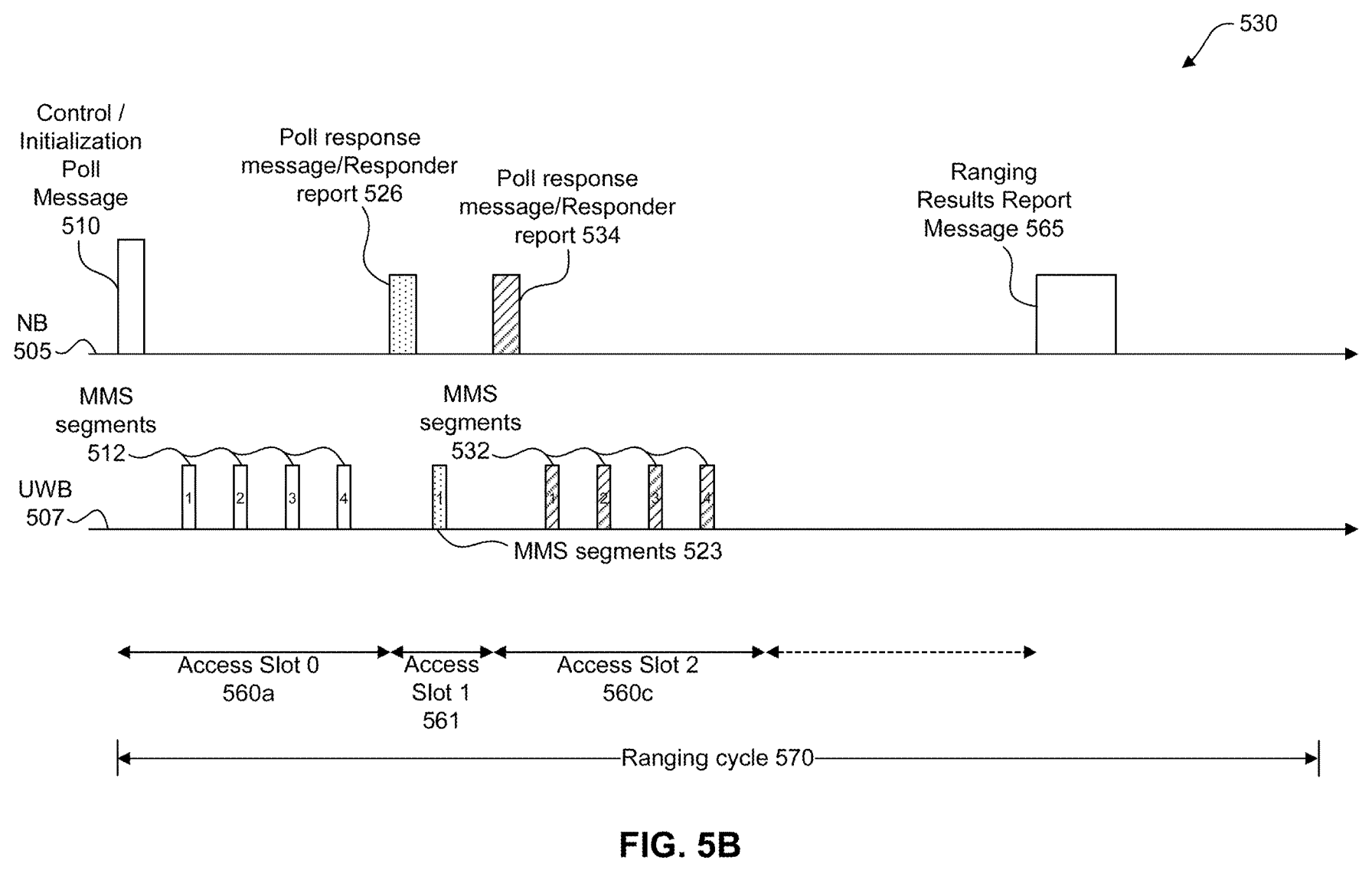

FIG. 5B illustrates example 530 of one-to-many ranging using NBA-MMS UWB protocols with adaptive access slot size, according to some embodiments of the disclosure. For explanation purposes and not a limitation, FIG. 5B may be described with reference to elements from other figures within the disclosure. For example, portions of example 550 can be performed by initiator device 120 and/or responder devices 110*a*-110*c* of FIG. 1A, or system 200 of FIG. 2. Example 530 is similar to example 500, but assumes that initiator device is aware of the existing responder devices 110*a*, 110*b*, and/or 110*c*. For example, initiator device 120 may be aware that responder device 110*a* is in close proximity based on earlier ranging calculations (e.g., based on RSSI from a previous NB exchange), and responder device 110*b* is farther away. Accordingly, initiator device 120 indicates a scheduled ranging mode in control/initialization poll message 510 that specifies a lesser number of MMS segments needed to determine an accurate ranging estimation (e.g., one MMS segment) is needed from responder device 110*a*, while responder device 110*b* that is farther away needs more MMS segments to have accurate range estimation. Thus, initiator device 120 can dynamically assign different lengths for access slots in a ranging cycle based on initiator device 120's prior ranging calculations, and assign access slots accordingly to responder devices 110*a*, 110*b*, and/or 110*c*. By adapting access slot sizes, initiator device 120 can receive less MMS segments corresponding to utilizing less power, and shorten a duration of ranging cycle 570 which can be better for collision avoidance.

Figure 6:
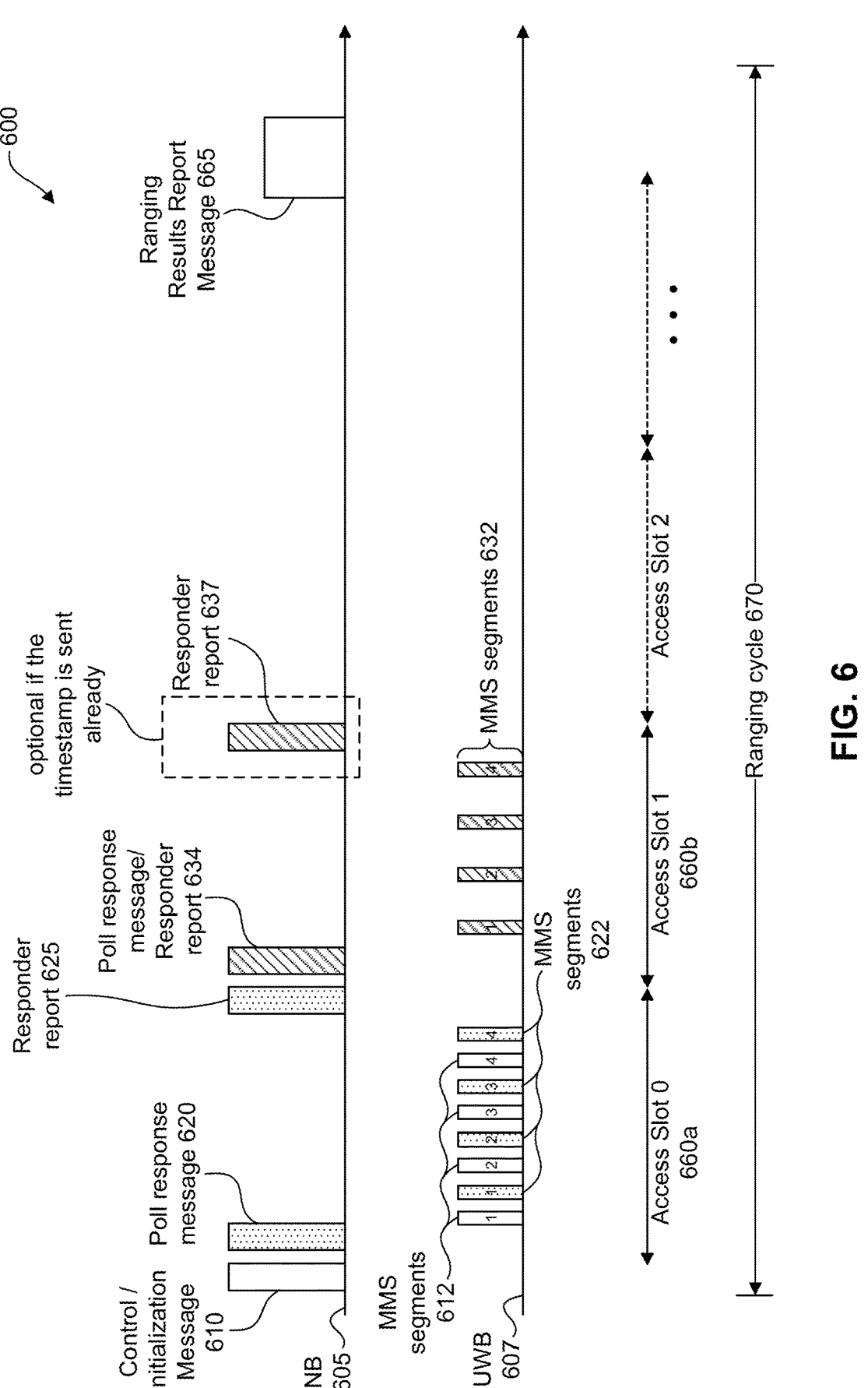
FIG. 6 illustrates an example of one-to-many ranging using NBA-MMS UWB protocols with partially interleaved MMS segments, according to some embodiments of the disclosure.

A frame exchange sequence for access slot 1 561 can include initiator device 120 receiving via NB 505, poll response message/responder report 526 that can includes an identifier such as MAC address that identifies responder device 110*a* as well as timestamps corresponding to received MMS segments of MMS segments 512. Since initiator device 120 indicated a scheduled ranging mode in control/initialization poll message 510 that specifies one MMS segment (e.g., MMS segment 523) is needed from responder device 110*a* to perform ranging, responder device 110*a* can transmit MMS segment 523 via UWB 507 corresponding to poll response message/responder report 526 (and control/initialization poll message 510.) FIG. 6 illustrates example 600 of one-to-many ranging using NBA-MMS UWB protocols with partially interleaved MMS segments, according to some embodiments of the disclosure. For explanation purposes and not a limitation, FIG. 6 may be described with reference to elements from other figures within the disclosure. For example, portions of example 600 can be performed by initiator device 120 and/or responder devices 110*a*-110*c* of FIG. 1A, or system 200 of FIG. 2. Example 600 has a non-homogeneous access slot structure for initiator device 120 and can result in one less access slot for 5 ranging cycle 670.

In example 600, a frame exchange sequence for access slot 0 660*a* can include initiator device 120 transmitting control/initialization poll message 610 via NB 605, receiving poll response message 620 in response from a responder 10 device (e.g., responder device 110*a*) via NB 605, transmitting MMS segments 612 according to control/initialization poll message 610 via UWB 607, and receiving MMS segments 622 according to poll response message 620 via UWB 307, where MMS segments 612 and MMS segments 15 622 are interleaved. Initiator device 120 can receive in access slot 0 660*a* via NB 605, responder report 625 from responder device 110*a* that received MMS segments 612. Responder report 625 can include an identifier such as a MAC address that identifies responder device 110*a* as well 20 as timestamps corresponding to received MMS segments of MMS segments 612.

Control/initiation poll message 610 can include but is not limited to: configuration information regarding ranging cycle 670 (e.g., adaptive access slot configurations for 25 different responder devices 110*a*-110*c* for scheduled-mode), and an initial poll message. In some embodiments, control/initialization poll message 610 can be split into two independent messages.

A frame exchange sequence for access slot 1 660*b* can 30 include initiator device 120 receiving via NB 605, poll response message/responder report 634 from a responder device (e.g., responder device 110*b*) that includes timestamps corresponding to responder device 110*b* receiving MMS segments 612. Initiator device 120 can receive MMS 35 segments 632 according to poll response message/responder report 634 via UWB 607. Since the timestamps are already transmitted in poll response message/responder report 634, responder report 637 is optional.

Prior to the end of ranging cycle 670, initiator device 120 40 can calculate ranging results corresponding to responder devices (e.g., responder device 110*a*) based on the received corresponding responder reports (e.g., responder report 634) and transmit ranging results report message 665 via NB 305. Corresponding responder devices (e.g., responder device 45 110*a*) can receive ranging results report message 665 and use the corresponding ranging results in various ranging applications with initiator device 120.

FIG. 7 illustrates an example of one-to-many ranging using NBA-MMS UWB protocols with polling in NB first 50 and MMS segments later, according to some embodiments of the disclosure. For explanation purposes and not a limitation, FIG. 7 may be described with reference to elements from other figures within the disclosure. For example, portions of example 700 can be performed by initiator 55 device 120 and/or responder devices 110*a*-110*c* of FIG. 1A, or system 200 of FIG. 2. In example 700, initiator device 120 can schedule the polling for a responder report (e.g., a timestamp report) based on contention-based ranging. In example 700, initiator device 120 can transmit control/ 60 initialization poll message 710 via NB 705 but does not transmit MMS segments 732 in access slot 0 760*a*. Instead, initiator device 120 waits for responder devices (e.g., responder devices 110*a*, 110*b*) to complete transmission of poll response messages 720 (740 in access slot 1 760*b*) and 65 corresponding MMS segments 722 (742) before transmitting poll message 730 via NB 705 and MMS segments 732 via UWB 707. Subsequently, initiator device 120 can schedule and transmit polling message 750 to obtain corresponding report frames (e.g., responder reports 727, 747) from responder devices 110*a*, 110*b* to obtain timestamps.

Prior to the end of ranging cycle 770, initiator device 120 can calculate ranging results corresponding to responder devices 110*a*, 110*b*, and/or 110*c* based on the received corresponding responder reports (e.g., responder reports 727, 747) and transmit ranging results report message 765 via NB 505. Corresponding responder devices 110*a*, 110*b*, and/or 110*c* can receive ranging results report message 765 and use the corresponding ranging results in various ranging applications with initiator device 120.

Figure 8:
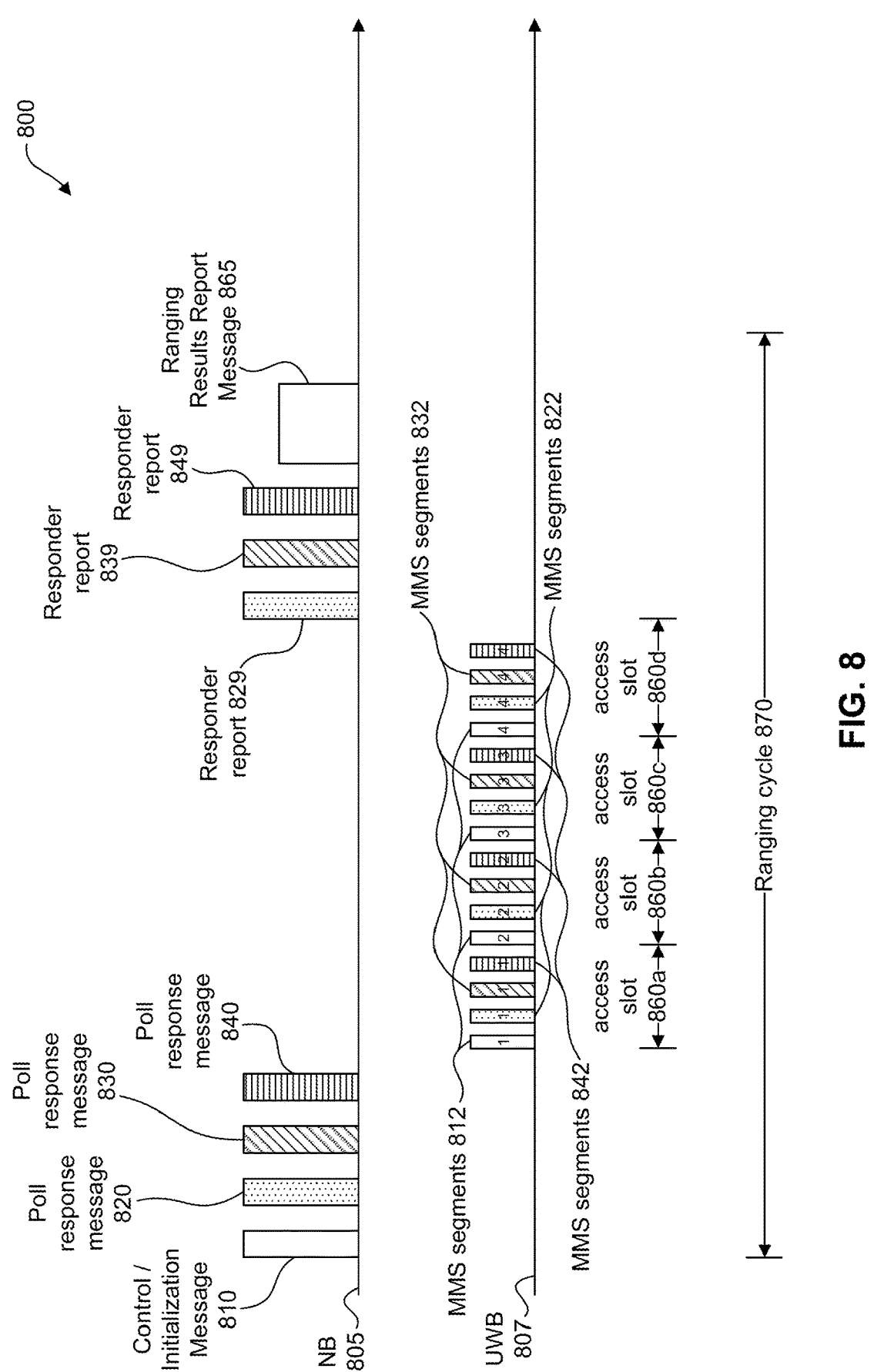
FIG. 8 illustrates an example of one-to-many ranging using NBA-MMS UWB protocols with interleaved MMS segments, according to some embodiments of the disclosure.

FIG. 8 illustrates example 800 of one-to-many ranging using NBA-MMS UWB protocols with interleaved MMS segments, according to some embodiments of the disclosure. For explanation purposes and not a limitation, FIG. 8 may be described with reference to elements from other figures within the disclosure. For example, portions of example 800 can be performed by initiator device 120 and/or responder devices 110*a*-110*c* of FIG. 1A, or system 200 of FIG. 2. Example 800 includes fully interleaved MMS segments where initiator device 120 processes multiple MMS segments from different responder devices (110*a*, 110*b*, 110*c*) in an access slot. Example 800 can shorten a duration of ranging cycle 870. In example 800, the clock drift between an NB message to the corresponding first MMS segment can be limited by a maximum gap (e.g., 2 ms between a NB poll message (e.g., NB poll frame) and a corresponding first MMS segment, thus, a limited number of responder devices may be scheduled (e.g., between control/initialization message 810 and the start of MMS segments 812.)

A frame exchange sequence for example 800 may include control/initialization poll message 810+Responder device poll response message(s)+combined MMS exchanges in each access slot+Initiator device 120/Responder device timestamp exchanges. In example 800 initiator device 120 can transmit control/initialization poll message 810 via NB 805 and receive corresponding poll response messages 820, 830, and 840 from responder devices 110*a*, 110*b*, and 110*c* in response. Initiator device 120 can receive via UWB 807 in access slot 860*a*, a first segment from corresponding sets of MMS segments 812, 822, 832, and 842. Initiator device 120 can receive a second segment from corresponding sets of MMS segments 812, 822, 832, and 842 in access slot 860*b*, and so on through access slot 860*c* and 860*d*.

Prior to the end of ranging cycle 870, initiator device 120 can receive via NB 805, responder report 829 from responder device 110*a*, responder report 839 from responder device 110*b*, and responder report 849 from responder device 110*c*, and calculate ranging results corresponding to responder devices 110*a*, 110*b*, and/or 110*c* based on the received corresponding responder reports (e.g., responder reports 829, 839, 849). Initiator device 120 can transmit ranging results report message 865 via NB 805, where ranging results report 865 includes the calculated ranging results. Corresponding responder devices 110*a*, 110*b*, and/or 110*c* can receive ranging results report message 865 and use the corresponding ranging results in various ranging applications with initiator device 120.

Figure 9:
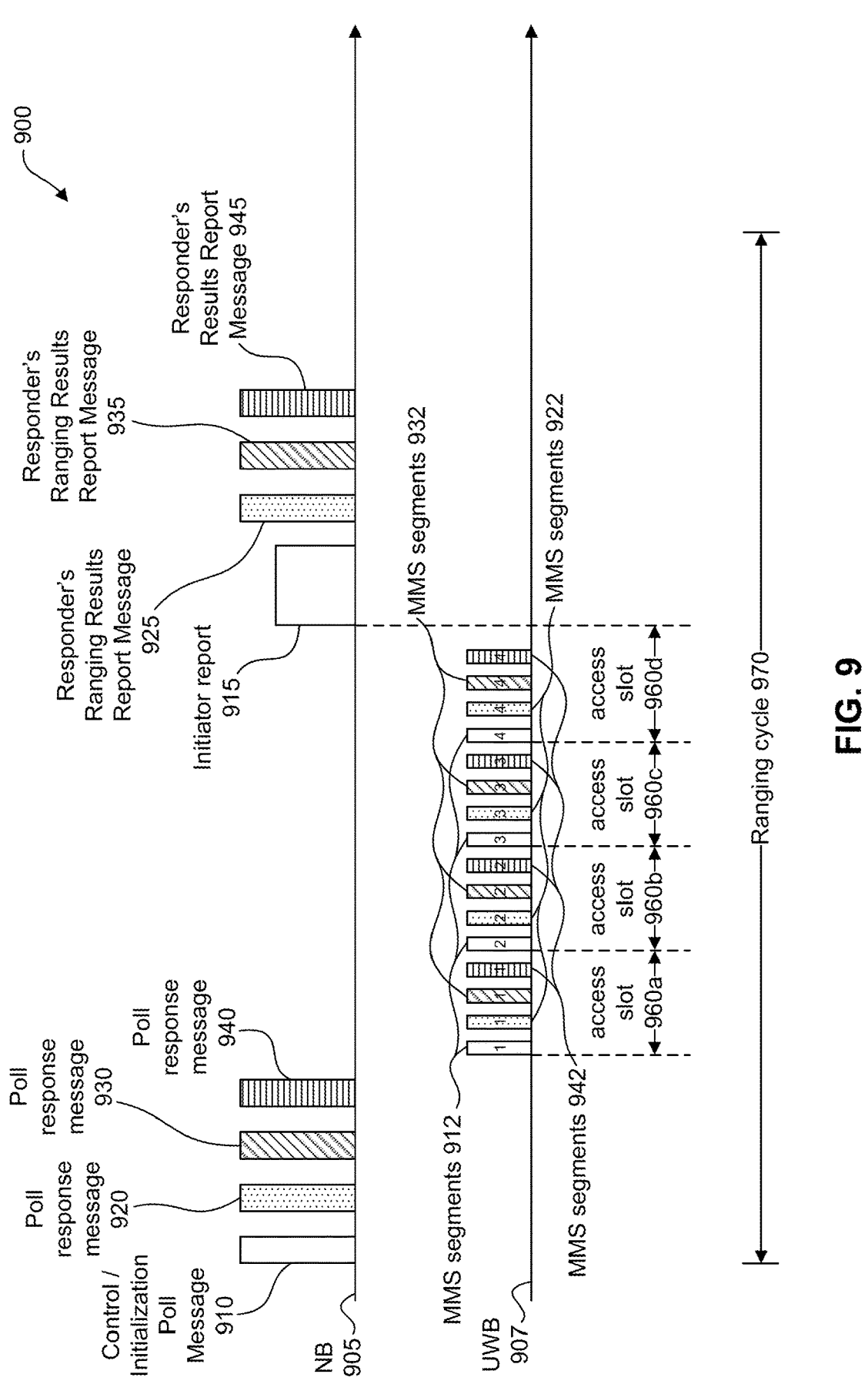
FIG. 9 illustrates an example of many-to-one ranging using NBA-MMS UWB protocols with many responders calculating the range, according to some embodiments of the disclosure.

FIG. 9 illustrates example 900 of many-to-one ranging using NBA-MMS UWB protocols with many initiator devices calculating the range, according to some embodiments of the disclosure. For explanation purposes and not a limitation, FIG. 9 may be described with reference to elements from other figures within the disclosure. For example, portions of example 900 can be performed by initiator devices 120 and/or responder device 110a-110c of FIG. 1A, or system 200 of FIG. 2. In changing from one-to-many ranging embodiments, many-to-one ranging embodiments, responder device NB packets (e.g., NB frames) containing responder device timestamps may be replaced with initiator device NB packets that includes initiator device accumulated timestamps. As an example, initiator device 120 may be a wireless speaker and responder devices 110a-110c may be smart phones. Example 900 is based on example 800, but is not limited to FIG. 8.

A frame exchange sequence for example 900 may include control/initialization poll message 910 from initiator device 120+responder devices 110a-110c poll response message (s)+ combined MMS exchanges in an access slot+initiator device 120/responder devices 110a-110c timestamp exchanges. In example 900 initiator device 120 can transmit control/initialization poll message 910 via NB 905 and receive corresponding poll response messages 920, 930, and 940 from responder devices 110a, 110b, and 110c in response to receiving control/initialization poll message 910. Initiator device 120 can receive via UWB 907 in access slot 960a, a first segment from corresponding sets of MMS segments 912, 922, 932, and 942. Initiator device 120 can receive a second segment from corresponding sets of MMS segments 912, 922, 932, and 942 in access slot 960b, and so on through access slot 960c and 960d.

Prior to the end of ranging cycle 970, initiator device 120 can transmit via NB 905, initiator device 120's report 915 based on receiving the various MMS segments. In other words, initiator device 120 can broadcast the timestamps collected based on the various MMS segments received. Responder device 110a calculates ranging results based on MMS segments 912 received and initiator device 120's report 915, and optionally transmits via NB 905, responder device 110a's ranging results report message 925. Responder device 110b calculates ranging results based on MMS segments 912 received and initiator device 120's report 915, and optionally transmits via NB 905, responder 110b's ranging results report message 935. Responder device 110c calculates ranging results based on MMS segments 912 received and initiator device 120's report 915, and optionally transmits via NB 905, responder device 110c's ranging results report message 945. Initiator device 120 can receive the various ranging results report messages 925, 935, and 945 and can use the ranging results in various ranging applications with responder devices 110a-110c.

Figure 10:
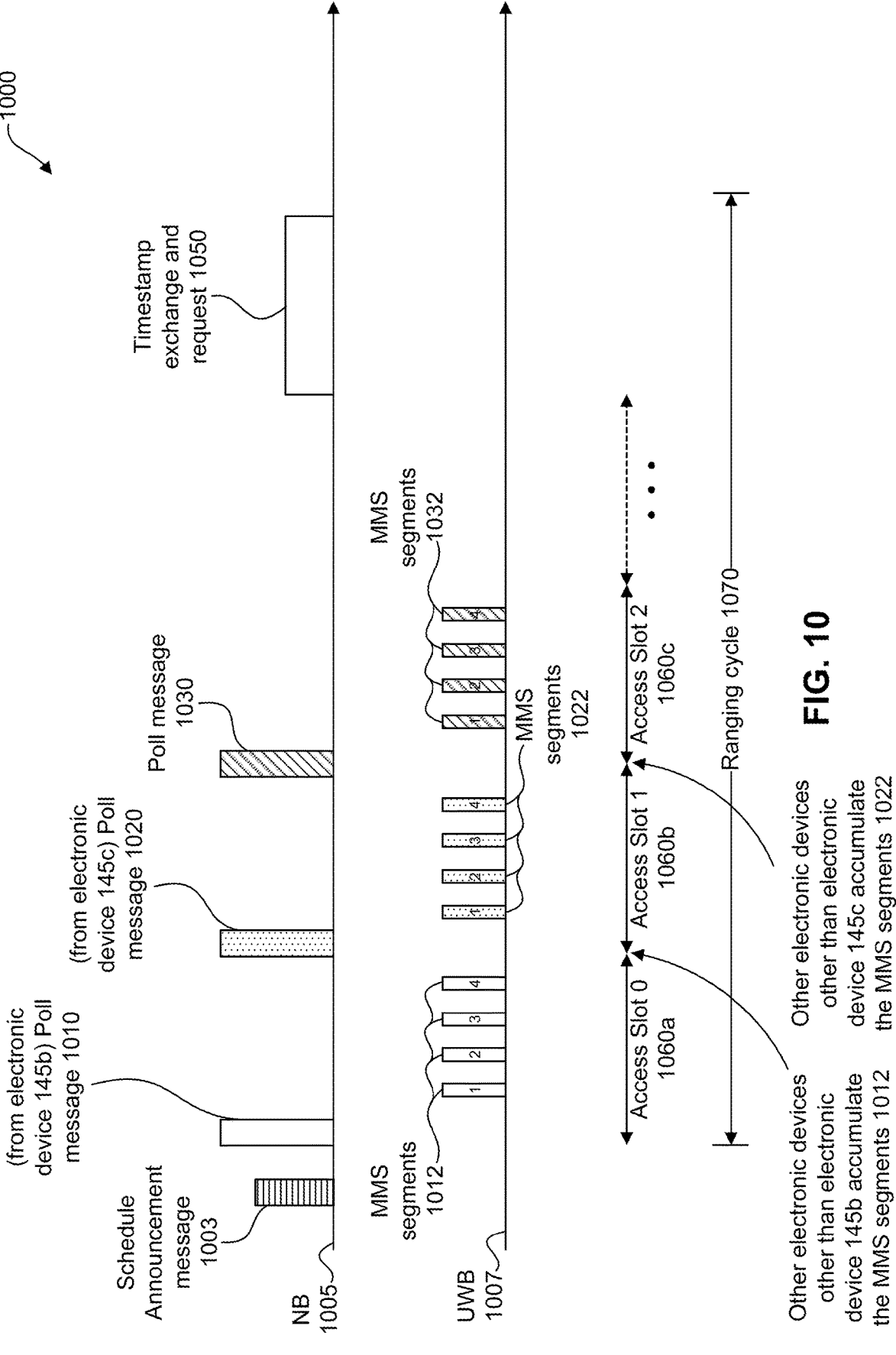
FIG. 10 illustrates an example of many-to-many ranging with coordinated initiators using NBA-MMS UWB protocols with dual roles, according to some embodiments of the disclosure.

FIG. 10 illustrates example 1000 of many-to-many ranging with coordinated initiators using NBA-MMS UWB protocols with dual roles, according to some embodiments of the disclosure. For explanation purposes and not a limitation, FIG. 10 may be described with reference to elements from other figures within the disclosure. For example, portions of example 1000 can be performed by electronic devices 145a-145e (e.g., anchor devices) of FIG. 1B, or system 200 of FIG. 2. Electronic devices 145a-145e can communicate to establish an indoor navigation system (e.g., within a shopping mall.) Accordingly, initiator devices (e.g., initiator device 120d) may communicate with one or more electronic devices 145a-145e to localize within the indoor space and/or navigate within the indoor space (e.g., navigate a map of shops in the mall.) When there are N electronic devices in a wireless network that intend to range with each other, N(N−1)/2 peer to peer ranging operations are needed. Some embodiments reduce the number of ranging operations and hence ranging packets over the air. In other words, example 1000 makes better use of wireless network resources.

Example 1000 illustrates many-to-many ranging with coordinated initiators using NBA-MMS UWB protocols with dual roles where one electronic device 145 of electronic devices 145a-145e schedules an announcement to the wireless network. Schedule announcement message 1003 can indicate: the configuration of ranging cycle 1070, the order in which electronic devices 145a-145e transmit their corresponding NB poll messages and their MMS segments, and/or a number of MMS segments corresponding to each electronic device 145a-145e. Timestamp exchange and request 1050 can include: data exchange on NB 1005 that can be independent (e.g., a different order) from the ranging order in schedule announcement message 1003. Different electronic devices 145a-145e may have different set of accumulated timestamps (e.g., one electronic device (e.g., electronic device 145a) may only want to range with a subset of the remaining electronic devices 145 (e.g., range only with electronic device 145a and 145b.) In some examples, timestamp exchange and request 1050 can be used when some measurement is not available such that the next schedule announcement message could be dedicated to these missing ranging operations. In some examples, fragmentation and automatic repeat request (ARQ) design for the data exchange on NB 1005 may apply to timestamp exchange and request 1050. Accordingly, for N electronic devices, N peer to peer ranging operations (e.g., NMMS exchange sequences) in UWB 1007 are needed, which is an improvement over N(N−1)/2 peer ranging operations.

In example 1000, electronic device 145a transmits via NB 1005, schedule announcement message 1003. According to schedule announcement message 1003, in access slot 0 1060a, electronic device 145b transmits via NB 1005, poll message 1010 followed by corresponding MMS segments 1012 via UWB 1007. Remaining electronic devices 145a and 145c-145e accumulate (e.g., receive and process) MMS segments 1012. According to schedule announcement message 1003, in access slot 1 1060b, electronic device 145c transmits via NB 1005, poll message 1020 followed by corresponding MMS segments 1022 via UWB 1007. Remaining electronic devices 145a, 145b, and 145d-145e accumulate (e.g., receive and process) MMS segments 1022. According to schedule announcement message 1003, in access slot 2 1060c, electronic device 145d transmits via NB 1005, poll message 1030 followed by corresponding MMS segments 1032 via UWB 1007. Remaining electronic devices 145a-145c and 145e accumulate (e.g., receive and process) MMS segments 1032. This process rotates so that each of electronic devices 145a-145e transmit their corresponding poll message and corresponding MMS segments that are accumulated by the remaining electronic devices 145.

Prior to the end of ranging cycle 1070, electronic devices 145a-145e exchange timestamps during timestamp exchange and request 1050, and calculate ranges between each other accordingly. Accordingly, only 5 MMS segment exchanges (e.g., N=5 in example 1000) are needed during ranging cycle 1070.

Figure 11A:
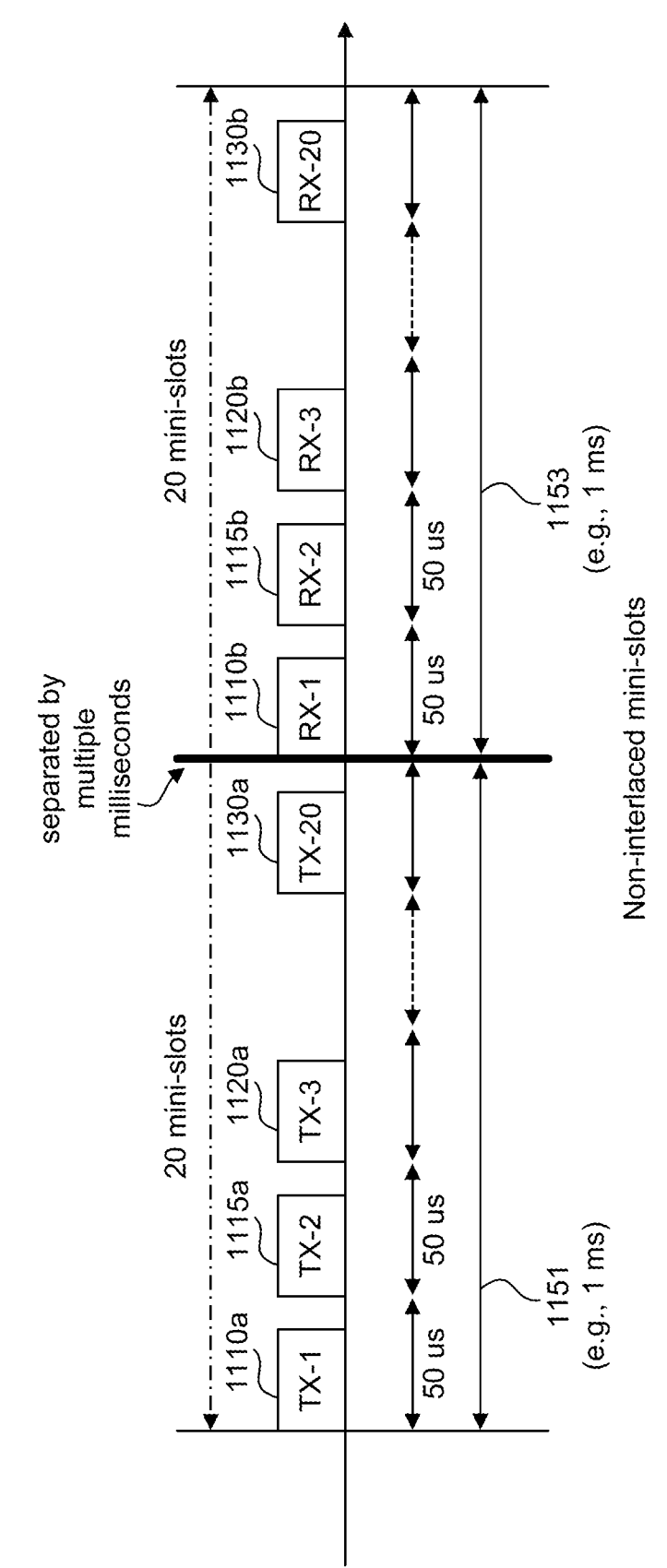
FIG. 11A illustrates an example of non-interlaced mini-slots for many-to-many ranging with independent initiators using NBA-MMS UWB protocols, according to some embodiments of the disclosure.

FIG. 11A illustrates example 1100 of non-interlaced minislots for many-to-many ranging with independent initiators using NBA-MMS UWB protocols, according to some embodiments of the disclosure. For explanation purposes and not a limitation, FIG. 11A may be described with reference to elements from other figures within the disclosure. For example, portions of example 1100 can be performed by initiator devices 120e-120g and/or responder devices 110e-110g of FIG. 1C, or system 200 of FIG. 2. Initiator devices 120e-120g may be in a space (e.g., office, room, building) where initiator devices 120e-120g perform ranging with corresponding responder devices (e.g., responder devices 110e-110g.) Some embodiments enable initiator devices 120e-120g and responder devices 110e-110g to utilize wireless resources (e.g., access radio frequencies) in a single ranging cycle (e.g., a single ranging superframe) as described below.

Example 1100 enables initiator devices 120e-120g and responder devices 110e-110g to utilize wireless access (e.g., airtime) in a single ranging cycle (e.g., a single ranging superframe) with non-interlaced mini-slots. Example 1100 includes 20 mini-slots for transmitting within duration 1151 that is 1 ms in length, and 20 mini-slots for receiving in duration 1153 that is also 1 ms in length, where a reuse factor of the mini-slots can be 20. A segment duration 1110 (e.g., segment durations 1110a, 1115a, 1120a, 1130a, 1110b, 1115b, 1120b, 1130b) can be less than 50 μs in length, and a segment turn around duration can be less than or equal to 50 μs. For example, durations 1151 and 1153 can be similar to durations 551 and 553 of FIG. 5A.

In example 1100, initiator device 120e may transmit MMS segment TX-1 1110a that can be less than 50 μs in length, and several milliseconds later, receive MMS segment RX-1 1110b from corresponding responder device 110e. The several milliseconds later can be for example, a few milliseconds between duration 551 duration 553 of FIG. 5A. Initiator device 120f may transmit MMS segment TX-2 1115a that can be less than 50 μs in length, and several milliseconds later, receive MMS segment RX-2 1115b from corresponding responder device 110f. Initiator device 120g may transmit MMS segment TX-3 1120a that can be less than 50 μs in length, and several milliseconds later, receive MMS segment RX-3 1115b from corresponding responder device 110g.

Figure 11B:
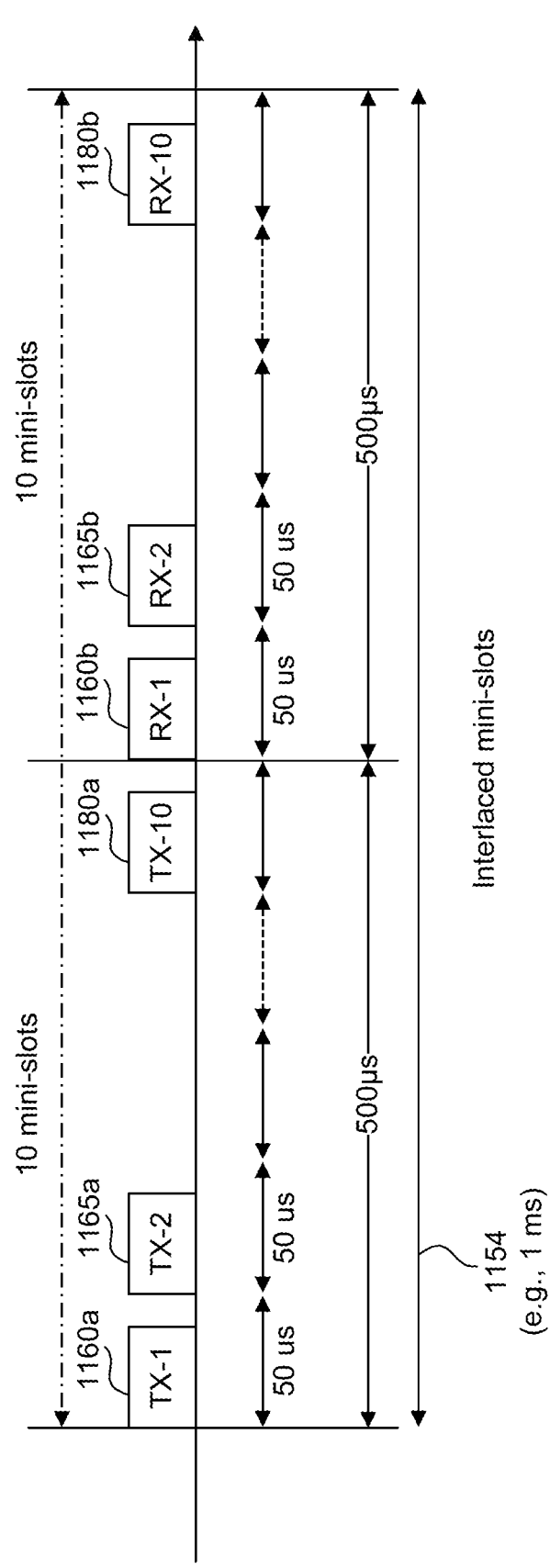
FIG. 11B illustrates an example of interlaced mini-slots for many-to-many ranging with independent initiators using NBA-MMS UWB protocols, according to some embodiments of the disclosure.

FIG. 11B illustrates example 1150 of interlaced mini-slots for many-to-many ranging with independent initiators using NBA-MMS UWB protocols, according to some embodiments of the disclosure. For explanation purposes and not a limitation, FIG. 11B may be described with reference to elements from other figures within the disclosure. For example, portions of example 1150 can be performed by initiator devices 120e-120g and/or responder devices 110e-110g of FIG. 1C, or system 200 of FIG. 2.

Example 1150 enables initiator devices 120e-120g and responder devices 110e-110g to utilize wireless resources in a single ranging cycle with interlaced mini-slots. Example 1150 includes 20 mini-slots within 1 ms as shown in duration 1154, where a reuse factor can be 10. In other words, 10 mini-slots are used for transmitting and 10 mini-slots are used for receiving. A segment duration (e.g., segment durations 1160a, 1165a, 1180a, 1160b, 1165b, 1180b) can be less than 50 μs in length and a segment turn around duration can be less than or equal to 450 μs. Each initiator device 120e-120g may choose one pair of mini-slots for {TX-i, RX-i} as long as the segment turnaround time is satisfied. In an example, duration 1154 can be similar to duration 354 of FIG. 3.

In example 1150, initiator device 120e may transmit MMS segment TX-1 1160a that can be less than 50 μs in length, and in the second half (e.g., second 500 μs) of duration 1154, receive MMS segment RX-1 1160b from corresponding responder device 110e. Initiator device 120f may transmit MMS segment TX-2 1165a that can be less than 50 μs in length, and in the second half of duration 1154, receive MMS segment RX-2 1165b from corresponding responder device 110f. Initiator device 120g may transmit MMS segment TX-3 1180a that can be less than 50 μs in length, and in the second half of duration 1154, receive MMS segment RX-3 1180b from corresponding responder device 110g.

Figure 12A:
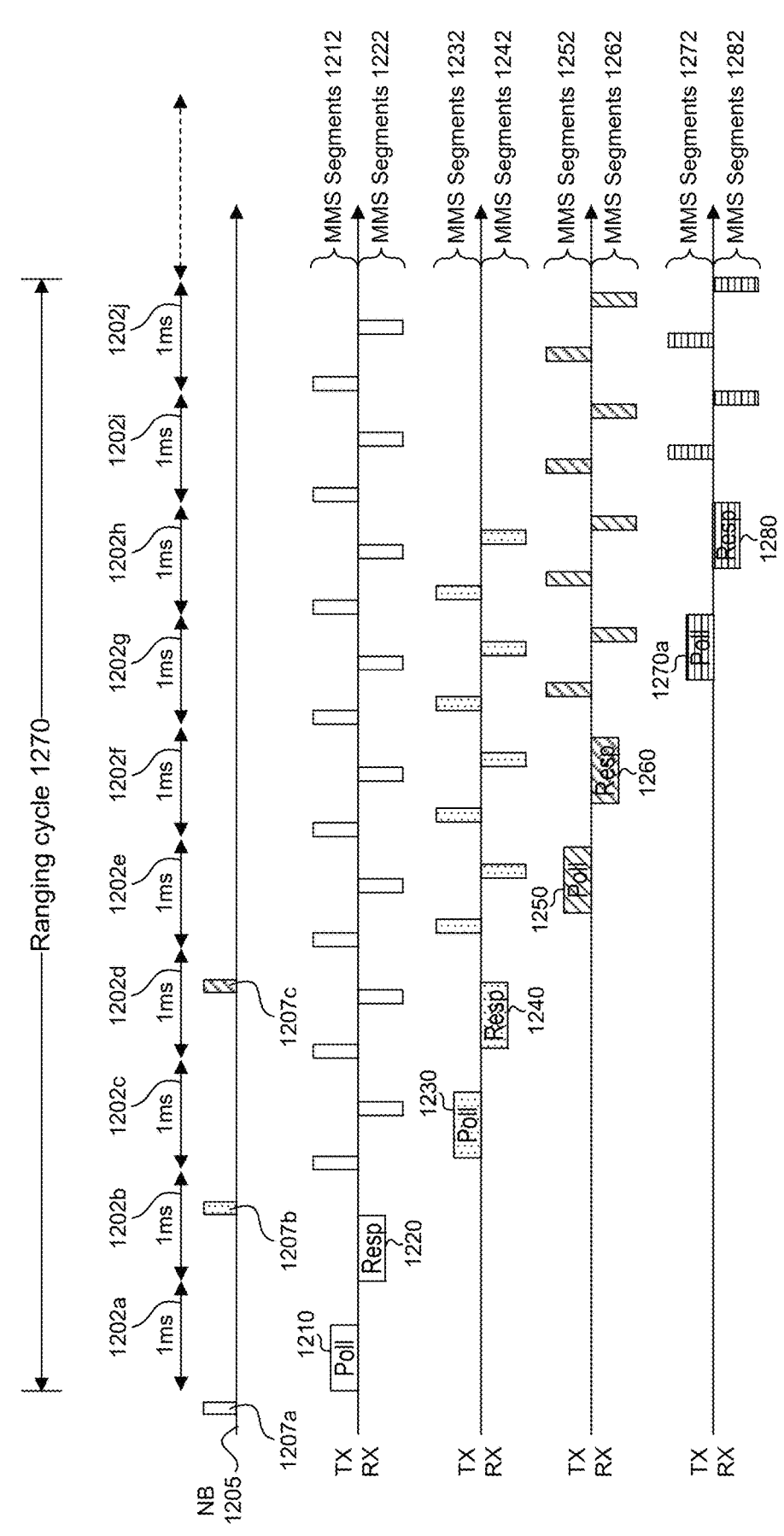
FIG. 12A illustrates an example of many-to-many ranging with independent initiators using NBA-MMS UWB protocols with a same NB channel, according to some embodiments of the disclosure.

FIG. 12A illustrates example 1200 of many-to-many ranging with independent initiators using NBA-MMS UWB protocols with a same NB channel, according to some embodiments of the disclosure. For explanation purposes and not a limitation, FIG. 11B may be described with reference to elements from other figures within the disclosure. For example, portions of example 1200 can be performed by initiator devices 120e-120g and/or responder devices 110e-110g of FIG. 1C, or system 200 of FIG. 2. Example 1200 may utilize interlaced mini-slots as described in example 1150 of FIG. 11B.

In example 1200, initiator devices 120e-120g and corresponding responder devices 110e-110g of FIG. 1C utilize the same NB 1250 (e.g., same NB channel) in ranging cycle 1270 that includes 10 ms shown as durations 1202a-1202j. Accordingly, the poll messages and corresponding poll response messages transmitted on NB 1250 are staggered to avoid collisions. Further, after a first initiator device establishes ranging cycle 1270, subsequent initiator devices and corresponding responder devices are limited in the number of MMS segments exchanged based on a remaining duration of ranging cycle 1270.

Initiator device 120e can listen to NB 1205 (e.g., NB advertisement channel) to determine whether a ranging cycle has been established. Sensing that initiator device 120e is the first initiator device, initiator device 120e can establish ranging cycle 1270, select mini-slot 0 (e.g., mini-slot 0 pair 1160a and 1160b), and transmit NB advertisement message 1207a on NB 1205. Subsequently, initiator device 120e can transmit poll message 1210 via NB 1205 in duration 1202a, and receive poll response message 1220 from corresponding responder device 110e via NB 1205 in duration 1202b. In some embodiments, poll messages and poll response messages (e.g., poll message 1210 and poll response message 1220) can be transmitted on NB channels that are different than NB 1205. Initiator device 120e can transmit MMS segments 1212 in mini-slot 1160a in remaining durations 1202c-1202j, and receive MMS segments 1222 from corresponding responder device 110e in mini-slot 1160b in remaining durations 1202c-1202j.

Initiator device 120f can listen to NB 1205 and receive NB advertisement message 1207a (e.g., block structure), determine that mini-slot 0 is used. Accordingly, initiator device 120f can select mini-slot 1 (e.g., mini-slot 1 pair 1165a and 1165b), update the block structure, and transmit NB advertisement 1207b on NB 1205. Initiator device 120e may receive 1207b and update the block structure accordingly to reflect the selection of mini-slot 1 in subsequent transmissions of 1207a (not shown.) Initiator device 120f can transmit poll message 1230 via NB 1205 in duration 1202c, and receive poll response message 1240 from corresponding responder device 110f via NB 1205 in duration 1202d. Initiator device 120f can transmit MMS segments 1232 in mini-slot 1165a in remaining durations 1202e-1202j, and receive MMS segments 1242 from corresponding responder device 110f in mini-slot 1165b in remaining durations 1202e-1202j. Note that the number of durations that initiator device 120f (and corresponding responder device 110f) can use is less than those utilized by initiator device 120e. In other words, initiator device 120f (and corresponding responder device 110f) are limited to a number of remaining durations of ranging cycle 1270 established by initiator device 120e to avoid collisions on NB 1205 or on other NB channels that are used for transmitting poll messages and poll response messages.

Initiator device 120g can listen to NB 1205 and receive NB advertisement message 1207b (e.g., block structure) and/or updated NB advertisement message 1207a, and determine that mini-slots 0 and 1 are being used. Accordingly, initiator device 120g can select mini-slot 2 (e.g., mini-slot 2 pair 1180a and 1180b), update the block structure, and transmit NB advertisement 1207c on NB 1205. NB advertisements 1207a and 1207b can also be updated according to the selection of mini-slot 2. Subsequently, initiator device 120g can transmit poll message 1250 via NB 1205 in duration 1202e, and receive poll response message 1260 from responder device 110g via NB 1205 in duration 1202f. Initiator device 120g can transmit MMS segments 1252 in mini-slot 1180a in remaining durations 1202g-1202j, and receive MMS segments 1262 from corresponding responder device 110g in mini-slot 1180b in remaining durations 1202g-1202j. Note that the number of durations that initiator device 120g (and corresponding responder device 110g) can use is less than those utilized by initiator device 120f. In other words, initiator device 120g (and corresponding responder device 110g) are limited to a number of remaining durations 1202 of ranging cycle 1270 established by initiator device 120e and the number of durations 1202 utilized by initiator device 120f. Example 1200 assumes another initiator device 120 and responder device 110 perform a similar process for many-to-many ranging, transmitting poll message 1270a, receiving poll response message 1280, and using corresponding MMS segment transmissions 1272 and 1282.

Figure 12B:
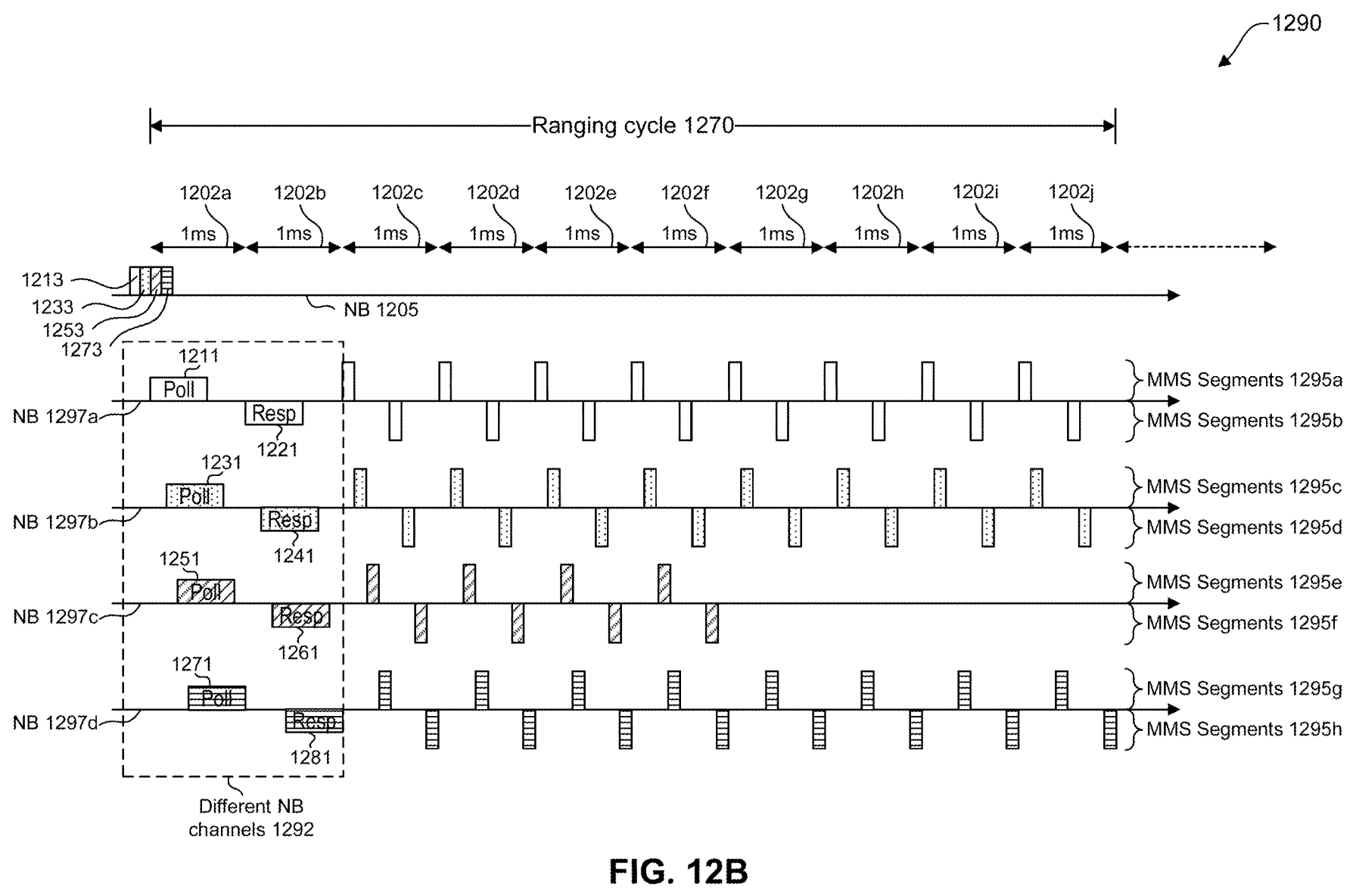

FIG. 12B illustrates example 1290 of many-to-many ranging with independent initiators using NBA-MMS UWB protocols with NB channel hopping offset, according to some embodiments of the disclosure. For explanation purposes and not a limitation, FIG. 12B may be described with reference to elements from other figures within the disclosure. For example, portions of example 1290 can be performed by initiator devices 120e-120g and/or responder devices 110e-110g of FIG. 1C, or system 200 of FIG. 2. Example 1290 may utilize interlaced mini-slots as described in example 1150 of FIG. 11B.

In example 1290, initiator devices 120e-120g and corresponding responder devices 110e-110g of FIG. 1C utilize a same NB (e.g., same NB channel) for transmitting and receiving NB advertisement messages 1213, 1233, 1253, and 1273. But, initiator devices (e.g., initiator devices 120e-120g) and corresponding responder devices (e.g., responder devices 110e-110g) use different NB channels 1292 (e.g., NB 1297a-1297d) to transmit corresponding poll messages and poll response messages. Accordingly, the poll messages and poll response messages from initiator devices 120e-120g and their corresponding responder devices 110e-110g do not have to be staggered to avoid collisions, and the number of durations 1202 that an initiator device 120 uses does not have to be less than those utilized by an earlier initiator device 120. In other words, an initiator device 120 is limited to a number of durations 1202 of ranging cycle 1270 established and not by the number of durations 1202 utilized by an earlier initiator device 120. Accordingly, initiator devices and corresponding responder devices have more durations 1202 available for use compared to example 1200 of FIG. 12A.

Initiator device 120e can listen to NB 1205 (e.g., NB advertisement channel) to determine whether a ranging cycle has been established. Sensing that initiator device 120e is the first initiator device, initiator device 120e can establish ranging cycle 1270, select mini-slot 0 (e.g., mini-slot 0 pair 1160a and 1160b), and transmit NB advertisement message 1213 on NB 1205. Subsequently, initiator device 120e can transmit poll message 1211 via NB 1297a in duration 1202a, and receive poll response message 1221 from corresponding responder device 110e via NB 1297a in duration 1202b. Initiator device 120e can transmit MIMS segments 1295a in mini-slot 1160a in remaining durations 1202c-1202j, and receive MMS segments 1295b from corresponding responder device 110e in mini-slot 1160b in remaining durations 1202c-1202j.

Initiator device 120f can listen to NB 1205 and receive NB advertisement message 1213 (e.g., block structure), determine that mini-slot 0 is used. Accordingly, initiator device 120f can select mini-slot 1 (e.g., mini-slot 1 pair 1165a and 1165b), update the block structure, and transmit NB advertisement 1233 on NB 1205. Initiator device 120e may receive 1233 and update the block structure accordingly to reflect the selection of mini-slot 1 in subsequent transmissions of 1213 (not shown.) Subsequently, initiator device 120f can transmit poll message 1231 via NB 1297b in duration 1202a, and receive poll response message 1241 from corresponding responder device 110f via NB 1297b in duration 1202b. Initiator device 120f can transmit MMS segments 1295c in mini-slot 1165a in remaining durations 1202c-1202j, and receive MMS segments 1295d from corresponding responder device 110f in mini-slot 1165b in remaining durations 1202c-1202j. Note that the number of durations that initiator device 120f (and corresponding responder device 110f) can use is similar to those utilized by initiator device 120e. In other words, initiator device 120f (and corresponding responder device 110f) are limited to a number of durations of ranging cycle 1270 established by initiator device 120e.

Initiator device 120g can listen to NB 1205 and receive NB advertisement message 1233 (e.g., block structure) and/or updated NB advertisement message 1213, and, determine that mini-slots 0 and 1 are being used. Accordingly, initiator device 120g can select mini-slot 2 (e.g., mini-slot 2 pair 1180a and 1180b), update the block structure, and transmit NB advertisement 1253 on NB 1205. Subsequently, initiator device 120g can transmit poll message 1251 via NB 1297c in duration 1202a, and receive poll response message 1261 from corresponding responder device 110g via NB 1297c in duration 1202b. Initiator device 120g can transmit MMS segments 1295e in mini-slot 1180a in remaining durations 1202c-1202j, and receive MMS segments 1295f from corresponding responder device 110g in mini-slot 1180b in remaining durations 1202c-1202j. Note that the number of durations that initiator device 120g (and corresponding responder device 110g) uses is less than those available for use. Example 1290 assumes another initiator device 120 and corresponding responder device 110 perform a similar process for many-to-many ranging, using poll message 1271, poll response message 1281, NB 1297d, and corresponding MMS segment transmissions 1295g and 1295h.

Figure 13:
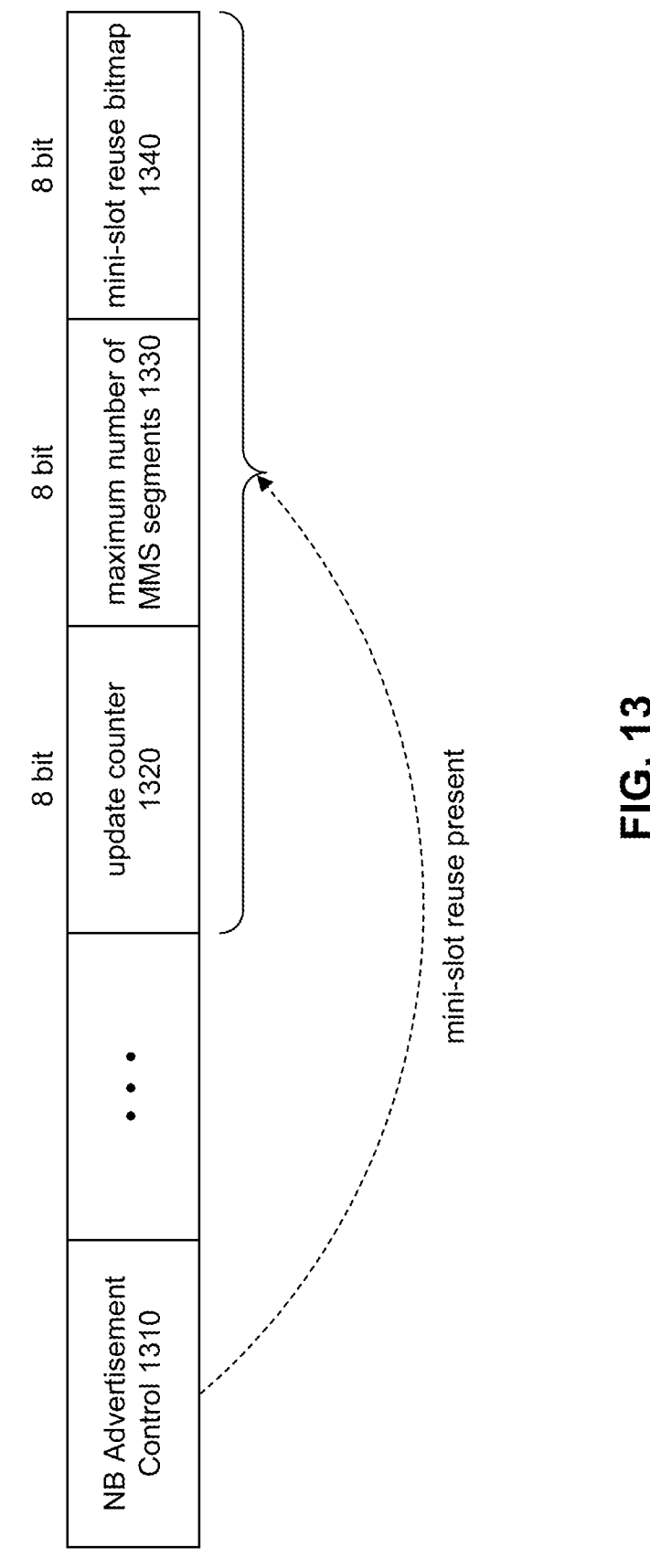
FIG. 13 illustrates an example of a NB advertisement message for many-to-many ranging with independent initiators using NBA-MMS UWB protocols, according to some embodiments of the disclosure.

FIG. 13 illustrates example 1300 of a NB advertisement message for many-to-many ranging with independent initiators using NBA-MMS UWB protocols, according to some embodiments of the disclosure. For explanation purposes and not a limitation, FIG. 13 may be described with reference to elements from other figures within the disclosure. For example, portions of example 1300 can be used by initiator devices 120e-120g and/or corresponding responder devices 110e-110g of FIG. 1C, or system 200 of FIG. 2. Example 1300 includes NB advertisement control 1310 that can indicate whether mini-slot reuse is present. Example 1300 can include update counter 1320, maximum number of MMS segments 1330 and mini-slot reuse bitmap 1340.

As described in examples 1200 of FIG. 12A, initiator devices 120e-120g can advertise their corresponding block structure and the associated "mini-slot reuse bitmap" on an NB Advertisement Channel (e.g., NB 1205.) For example, the first initiator device (e.g., initiator device 120e) can set the corresponding mini-slot reuse bitmap 1340 to 0000 0000 0000 0001 to reflect that mini-slot 0 (e.g., mini-slot 0 pair 1160a and 1160b) has been selected. The second initiator device (e.g., initiator device 120f can reset the corresponding mini-slot reuse bitmap 1340 to 0000 0000 0000 0011 since the adjacent mini-slot (e.g., mini-slot 1) is selected. When the first initiator device (e.g., initiator device 120e) sees an updated mini-slot reuse bitmap, initiator device 120e can also update the corresponding mini-slot reuse bitmap 1340 in the new NB advertisement message (e.g., 1207a). The chosen mini-slot can determine the TX time of NB Poll message and corresponding poll response message. Maximum number of MMS segments 1330 is determined by the first initiator device (e.g., initiator device 120e. When a same NB channel (e.g., NB 1205) is utilized by the initiator devices (e.g., initiator devices 120e-120g), the length of MMS exchange for corresponding mini-slot reuse pairs does not exceed the first initiator device's (e.g., initiator device 120e's) pair's advertisement block structure noted in maximum number of MMS segments 1330. When NB channel hopping offset is employed, corresponding mini-slot reuse pairs can utilize MMS segments up to maximum number of MMS segments 1330. Update counter 1320 can be increased by 1 each time a mini-slot reuse is claimed.

Figure 16A:
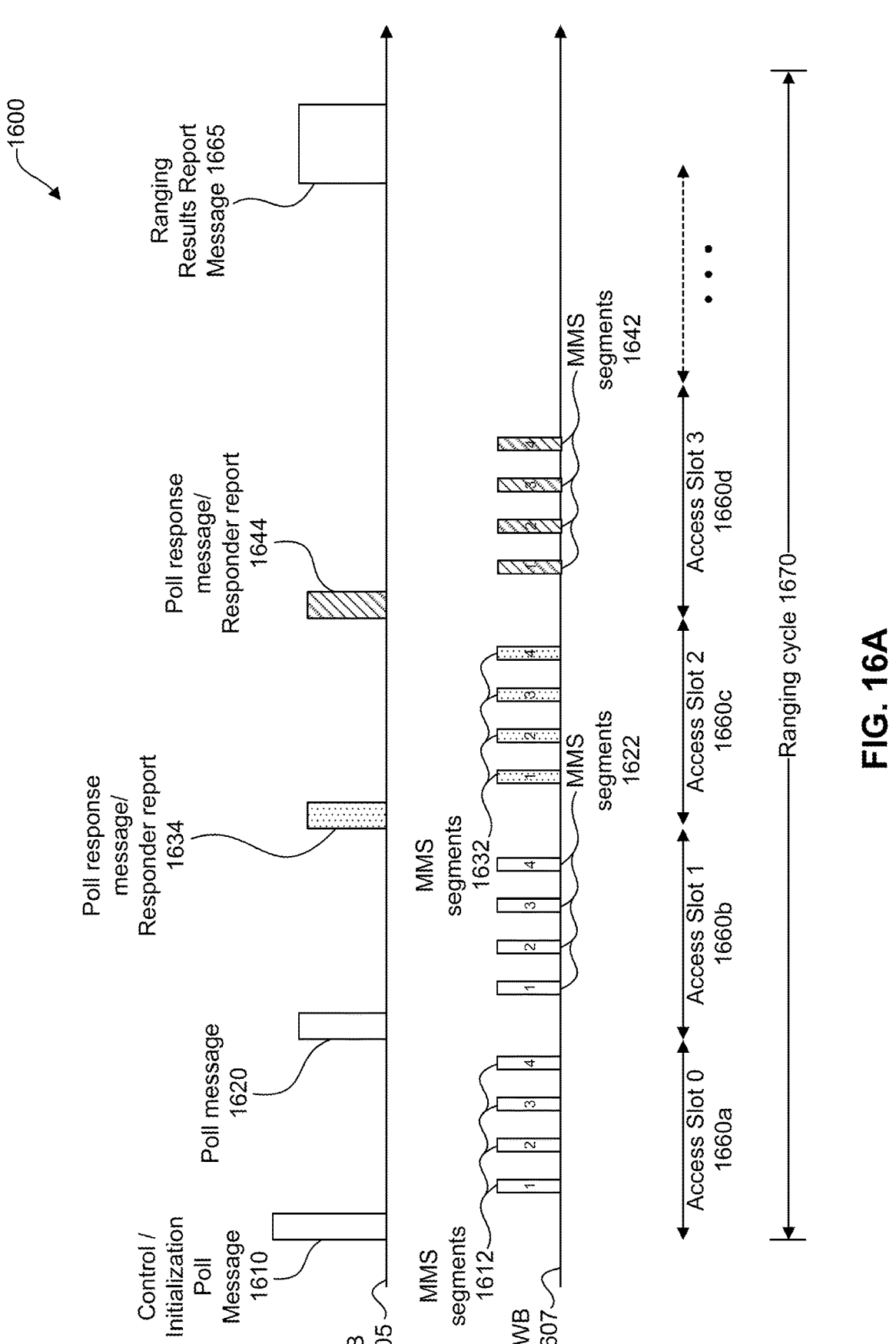
FIGS. 16A and 16B illustrate examples of one-to-many ranging using NBA-MMS UWB protocols for double-sided two-way ranging (DS-TWR), according to some embodiments of the disclosure.
Figure 16B:
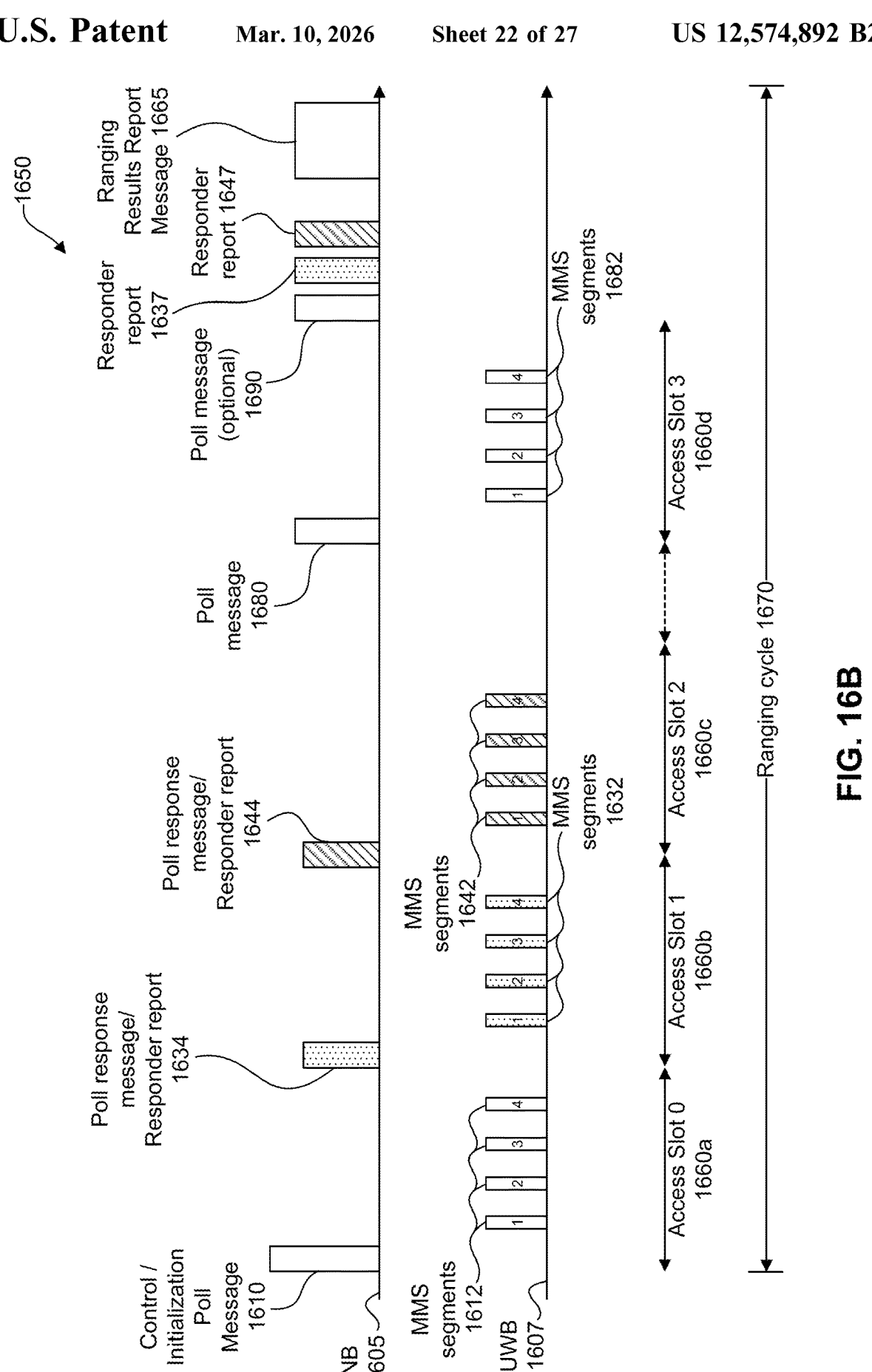

FIGS. 16A and 16B illustrate examples 1600 and 1650 of one-to-many ranging using NBA-MMS UWB protocols for double-sided two-way ranging (DS-TWR), according to some embodiments of the disclosure. For explanation purposes and not a limitation, FIGS. 16A and 16B may be described with reference to elements from other figures within the disclosure. For example, portions of examples 1600 and 1650 can be performed by initiator device 120 and/or responder devices 110a-110c of FIG. 1A, or system 200 of FIG. 2. Example 1600 illustrates a first DS-TWR (e.g., ping-ping-pong ranging.) In example 1600, initiator device 120 transmits a single NB transmission and corresponding MMS segments. For example, an access slot (e.g., access slot 0 1660a) includes one NB frame (e.g., control/initialization poll message 1610) and a corresponding set of MMS segments (e.g., MMS segments 1612.) An access slot can be for example, 5 ms in length (e.g., access slot 1 1660b.)

In example 1600, a frame exchange sequence for access slot 0 1660a can include initiator device 120 transmitting control/initialization poll message 1610 via NB 1605 (e.g., via NB signaling), and transmitting MMS segments 1612 via UWB 1607 according to control/initialization poll message 1610. Control/initiation poll message 1610 can include but is not limited to: configuration information regarding ranging cycle 1670 (e.g., adaptive access slot configurations for different responder devices 110a-110c for scheduled ranging mode), and an initial poll message. In some embodiments, control/initialization poll message 1610 can be split into two independent messages.

A frame exchange sequence for access slot 1 1660b can include initiator device 120 transmitting via NB 1605, poll message 1620 followed by MMS segments of MMS segments 1622 via UWB 1607.

A frame exchange sequence for access slot 2 1660c can include initiator device 120 receiving via NB 1605, poll response message/responder report 1634 that can include an identifier such as a MAC address that identifies responder device 110a as well as timestamps corresponding to received MMS segments of MMS segments 1622. Responder device 110a message/responder report 1634.

A frame exchange sequence for access slot 3 1660d can include initiator device 120 receiving via NB 1605, poll response message/responder report 1644 that can include an identifier such as a MAC address that identifies responder device 110b as well as timestamps corresponding to received MMS segments of MMS segments 1622. Responder device 110b can transmit MMS segments 1642 via UWB 1607 corresponding to poll response message/responder report 1644.

Prior to the end of ranging cycle 1670, initiator device 120 can calculate ranging results corresponding to responder devices 110a and 110b, based on the received corresponding responder reports (e.g., poll response message/responder report 1634, 1644) and transmit ranging results report message 1665 via NB 1605. Corresponding responder devices 110a, 110b can receive ranging results report message 1665 and use the corresponding ranging results in various ranging applications with initiator device 120. In some embodiments, if a single NB frame cannot accommodate ranging results report message 1665, ranging results report message 1665 may be split into multiple fragments and transmitted in more than one NB frame.

Example 1650 illustrates a second DS-TWR (e.g., ping-pong-ping ranging.) In example 1650, a frame exchange sequence for access slot 0 1660a can include initiator device 120 transmitting control/initialization poll message 1610 via NB 1605 (e.g., via NB signaling), and transmitting MMS segments 1612 via UWB 1607 according to control/initialization poll message 1610. Control/initiation poll message 1610 can include but is not limited to: configuration information regarding ranging cycle 1670 (e.g., adaptive access slot configurations for different responder devices 110a-110c for scheduled ranging mode), and an initial poll message. In some embodiments, control/initialization poll message 1610 can be split into two independent messages.

A frame exchange sequence for access slot 1 1660b can include initiator device 120 receiving via NB 1605, poll response message/responder report 1634 that can include an identifier such as MAC address that identifies responder device 110a as well as timestamps corresponding to received MMS segments of MMS segments 1612. Responder device 110a message/responder report 1634.

A frame exchange sequence for access slot 2 1660c can include initiator device 120 receiving via NB 1605, poll response message/responder report 1644 that can include an identifier such as MAC address that identifies responder device 110b as well as timestamps corresponding to received MMS segments of MMS segments 1612. Responder device 110b can transmit MMS segments 1642 via UWB 1607 corresponding to poll response message/responder report 1644.

A frame exchange sequence for access slot 3 1660d can include initiator device 120 transmitting via NB 1605, poll message 1680 followed by MMS segments of MMS segments 1682.

Prior to the end of ranging cycle 1670, initiator device 120 can transmit an optional poll message 1690, and receive corresponding responder reports (e.g., responder report 1637, 1647.) Initiator device 120 can calculate ranging results corresponding to responder devices 110a and 110b, based on the received corresponding responder reports (e.g., responder report 1637, 1647) and transmit ranging results report message 1665 including the calculations via NB 1605. Corresponding responder devices 110*a*, 110*b* can receive ranging results report message 1665 and use the corresponding ranging results in various ranging applications with initiator device 120.

Figure 17:
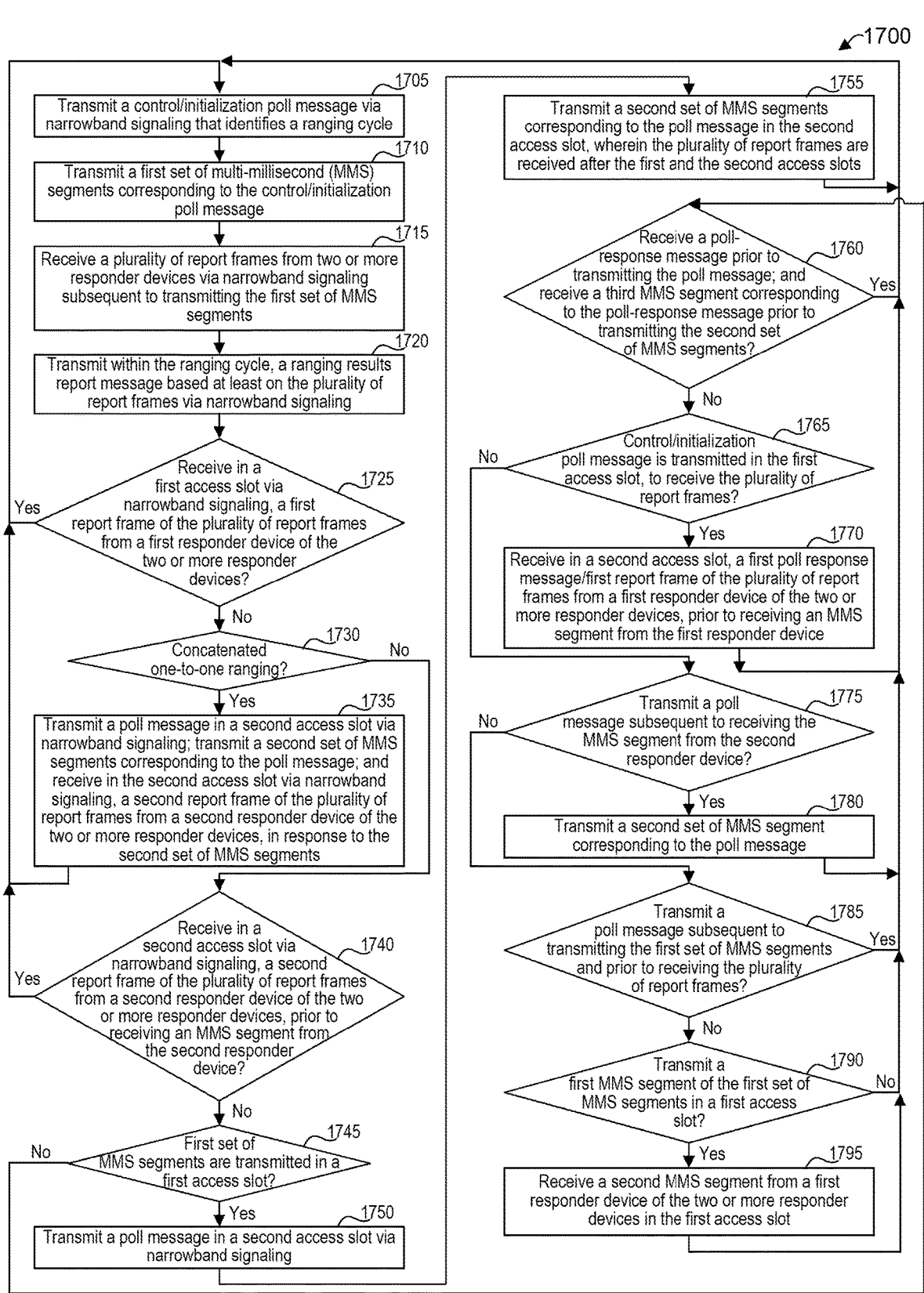
FIG. 17 illustrates an example method for one-to-many ranging using NBA-MMS UWB protocols, according to some embodiments of the disclosure.

FIG. 17 illustrates example method 1700 for one-to-many ranging using NBA-MMS UWB protocols, according to some embodiments of the disclosure. For explanation purposes and not a limitation, method 1700 may be described with reference to elements from other figures within the disclosure. For example, portions of example 550 can be performed by initiator device 120 and/or responder devices 110*a*-110*c* of FIG. 1A, or system 200 of FIG. 2.

At 1705, system 200 can transmit a control/initialization poll message via narrowband signaling that identifies a ranging cycle.

At 1710, system 200 can transmit a first set of multi-millisecond (MMS) segments corresponding to the control/initialization poll message.

At 1715, system 200 can receive a plurality of report frames from two or more responder devices via narrowband signaling subsequent to transmitting the first set of MMS segments.

At 1720, system 200 can transmit within the ranging cycle, a ranging results report message based at least on the plurality of report frames via narrowband signaling.

At 1725, when system 200 receives in a first access slot via narrowband signaling, a first report frame of the plurality of report frames from a first responder device of the two or more responder devices, method 1700 returns to 1705. Otherwise, method 1700 proceeds to 1730.

At 1730, when system 200 determines that concatenated one-to-one ranging is implemented, method 1700 proceeds to 1735. Otherwise, method 1700 proceeds to 1740.

At 1735, system 200 can transmit a poll message in a second access slot via narrowband signaling; transmit a second set of MMS segments corresponding to the poll message; and receive in the second access slot via narrowband signaling, a second report frame of the plurality of report frames from a second responder device of the two or more responder devices, in response to the second set of MMS segments. Method 1700 returns to 1705.

At 1740, when system 200 receives in a second access slot via narrowband signaling, a second report frame of the plurality of report frames from a second responder device of the two or more responder devices, prior to receiving an MMS segment from the second responder device, method 1700 returns to 1705. Otherwise, method 1700 proceeds to 1745.

At 1745, when system 200 determines that a first set of MMS segments are transmitted in a first access slot, method 1700 proceeds to 1750. Otherwise, method 1700 proceeds to 1760.

At 1750, system 200 can transmit a poll message in a second access slot via narrowband signaling.

At 1755, system 200 can transmit a second set of MMS segments corresponding to the poll message in the second access slot, where the plurality of report frames are received after the first and the second access slots.

At 1760, when system 200 receives a poll-response message prior to transmitting the poll message; and receive a third MMS segment corresponding to the poll-response message prior to transmitting the second set of MMS segments, method 1700 returns to 1705. Otherwise, method 1700 proceeds to 1765.

At 1765, when system 200 determines that a control/initialization poll message is transmitted in the first access slot, to receive the plurality of report frames, method 1700 proceeds to 1770. Otherwise, method 1700 proceeds to 1775.

At 1770, system 200 can receive in a second access slot, a first poll response message/first report frame of the plurality of report frames from a first responder device of the two or more responder devices, prior to receiving an MMS segment from the first responder device. Method 1700 returns to 1705.

At 1775, when system 200 transmits a poll message subsequent to receiving the MMS segment from the second responder device, method 1700 proceeds to 1780. Otherwise, method 1700 proceeds to 1785.

At 1780, system 200 can transmit a second set of MMS segment corresponding to the poll message. Method 1700 returns to 1705.

At 1785, when system 200 transmits a poll message subsequent to transmitting the first set of MMS segments and prior to receiving the plurality of report frames, system 200 can receive in a third access slot, a second poll response message/second report frame of the plurality of report frames from a second responder device of the two or more responder devices, prior to receiving an MMS segment from the second responder device. Method 1700 returns to 1705. Otherwise, method 1700 proceeds to 1790.

At 1790, when system 200 transmits a first MMS segment of the first set of MMS segments in a first access slot, method 1700 proceeds to 1795. Otherwise, method 1700 returns to 1705.

At 1795, system 200 can receive a second MMS segment from a first responder device of the two or more responder devices in the first access slot, and receive a third MMS segment from a second responder device of the two or more responder devices in the first access slot, wherein time-stamps of the reception of the second and third MMS segments are used in ranging calculations for the ranging results report message. Method 1700 can return to 1705.

FIG. 18 illustrates example method 1800 for one-to-many ranging using NBA-MMS UWB protocols with polling in NB first and transmitting MMS segments later, according to some embodiments of the disclosure. For explanation purposes and not a limitation, method 1800 may be described with reference to elements from other figures within the disclosure. For example, portions of method 1800 can be performed by initiator device 120 and/or responder devices 110*a*-110*c* of FIG. 1A, or system 200 of FIG. 2.

At 1810, system 200 can transmit a control/initialization poll message via narrowband signaling that identifies a ranging cycle.

At 1820, system 200 can receive two or more poll response messages in response to the control/initialization poll message and corresponding sets of multi-millisecond (MMS) segments corresponding to the two or more poll response messages.

At 1830, system 200 can, subsequent to receiving the corresponding sets of MMS segments, transmit a poll message via narrowband signaling and a set of MMS segments corresponding to the poll message.

At 1840, system 200 can receive a plurality of report frames from two or more responder devices via narrowband signaling subsequent to transmitting the set of MMS segments.

At 1850, system 200 can transmit within the ranging cycle, a ranging results report message based at least on the plurality of report frames via narrowband signaling.

Figure 19:
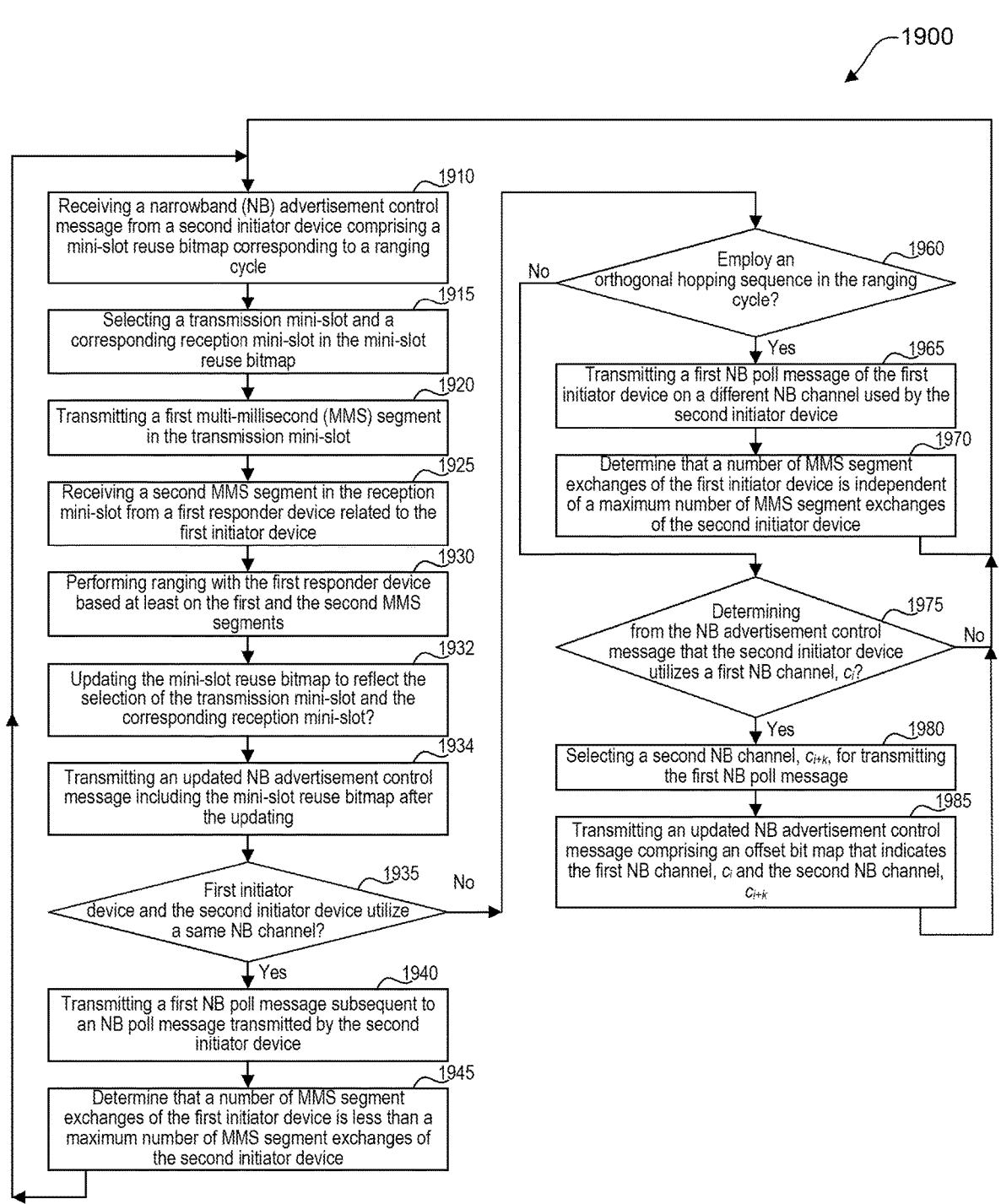
FIG. 19 illustrates an example method of many-to-many ranging with independent initiators using NBA-MMS UWB protocols, according to some embodiments of the disclosure.

FIG. 19 illustrates example method 1900 of many-to-many ranging with independent initiators using NBA-MMS UWB protocols, according to some embodiments of the disclosure. For explanation purposes and not a limitation, method 1900 may be described with reference to elements from other figures within the disclosure. For example, portions of example 550 can be performed by initiator devices 120e-120g and/or responder devices 110e-110g of FIG. 1C, or system 200 of FIG. 2.

At 1910, system 200 can receive a NB advertisement control message from a second initiator device comprising a mini-slot reuse bitmap corresponding to a ranging cycle.

At 1915, system 200 can select a transmission mini-slot and a corresponding reception mini-slot in the mini-slot reuse bitmap.

At 1920, system 200 can transmit a first multi-millisecond (MMS) segment in the transmission mini-slot.

At 1925, system 200 can receive a second MMS segment in the reception mini-slot from a first responder device related to the first initiator device.

At 1930, system 200 can perform ranging with the first responder device based at least on the first and the second MMS segments.

At 1932, system 200 updates the mini-slot reuse bitmap to reflect the selection of the transmission mini-slot and the corresponding reception mini-slot.

At 1934, system 200 can transmit an updated NB advertisement control message including the mini-slot reuse bitmap after the updating.

At 1935, when system 200 determines that a first initiator device and the second initiator device utilize a same NB channel, method 1900 proceeds to 1940. Otherwise, method 1900 proceeds to 1960.

At 1940, system 200 can transmit a first NB poll message subsequent to an NB poll message transmitted by the second initiator device.

At 1945, system 200 can determine that a number of MMS segment exchanges of the first initiator device is less than a maximum number of MMS segment exchanges of the second initiator device. Method 1900 returns to 1910.

At 1960, when system 200 employs an orthogonal hopping sequence in the ranging cycle, method 1900 proceeds to 1965. Otherwise, method 1900 proceeds to 1975.

At 1965, system 200 can transmit a first NB poll message of the first initiator device on a different NB channel used by the second initiator device.

At 1970, system 200 can determine that a number of MMS segment exchanges of the first initiator device is independent of a maximum number of MMS segment exchanges of the second initiator device. Method 1900 returns to 1910.

At 1975, when system 200 determines from the NB advertisement control message that the second initiator device utilizes a first NB channel, method 1900 proceeds to 1980. Otherwise, method 1900 returns to 1910.

At 1980, system 200 can select a second NB channel, $C_{i+k}$, for transmitting the first NB poll message.

At 1985, system 200 can transmit an updated NB advertisement control message comprising an offset bit map that indicates the first NB channel, $c_i$ and the second NB channel, $c_{i+k}$.

FIG. 20 illustrates example method 2000 of many-to-one ranging using NBA-MMS UWB protocols. For explanation purposes and not a limitation, method 2000 may be described with reference to elements from other figures within the disclosure. For example, portions of method 2000 can be performed by responder devices 110a-120c and/or initiator device 120 of FIG. 1A, or system 200 of FIG. 2.

At 2010, system 200 can transmit a control/initialization poll message via narrowband (NB) signaling that identifies a ranging cycle.

At 2020, system 200 can transmit a first multi-millisecond (MMS) segment corresponding to the control/initialization poll message in an access slot.

At 2030, system 200 can receive two or more MMS segments corresponding to two or more devices in the access slot.

At 2040, system 200 can transmit within the ranging cycle via NB signaling, a report frame comprising timestamps corresponding to the reception of the two or more MMS segments.

At 2050, system 200 can receive within the ranging cycle via NB signaling, two or more ranging results report messages correspondingly from the two or more responder devices, where the two or more ranging results report messages are based at least on the report frame.

FIG. 21 illustrates example method 2100 of many-to-many ranging with coordinated initiators using NBA-MMS UWB protocols with dual roles. For explanation purposes and not a limitation, method 2100 may be described with reference to elements from other figures within the disclosure. For example, portions of example 550 can be performed by electronic devices 145a-145e (e.g., anchor devices) of FIG. 1B, or system 200 of FIG. 2.

At 2110, system 200 can transmit in an access slot, a first poll message via narrowband (NB) signaling and a first set of multi-millisecond (MMS) segments according to a schedule announcement message, where the schedule announcement message comprises access slot assignments for N electronic devices in a ranging cycle, where the N electronic devices include the first electronic device.

At 2120, system 200 can receive N−1 poll messages via NB signaling and N−1 corresponding sets of MMS segments according to the schedule announcement message.

At 2130, system 200 can exchange timestamps corresponding to reception of the N−1 corresponding sets of MMS segments, with other N−1 electronic devices.

At 2140, system 200 can calculate ranges between the first electronic device and the other N−1 electronic devices.

Figure 15:
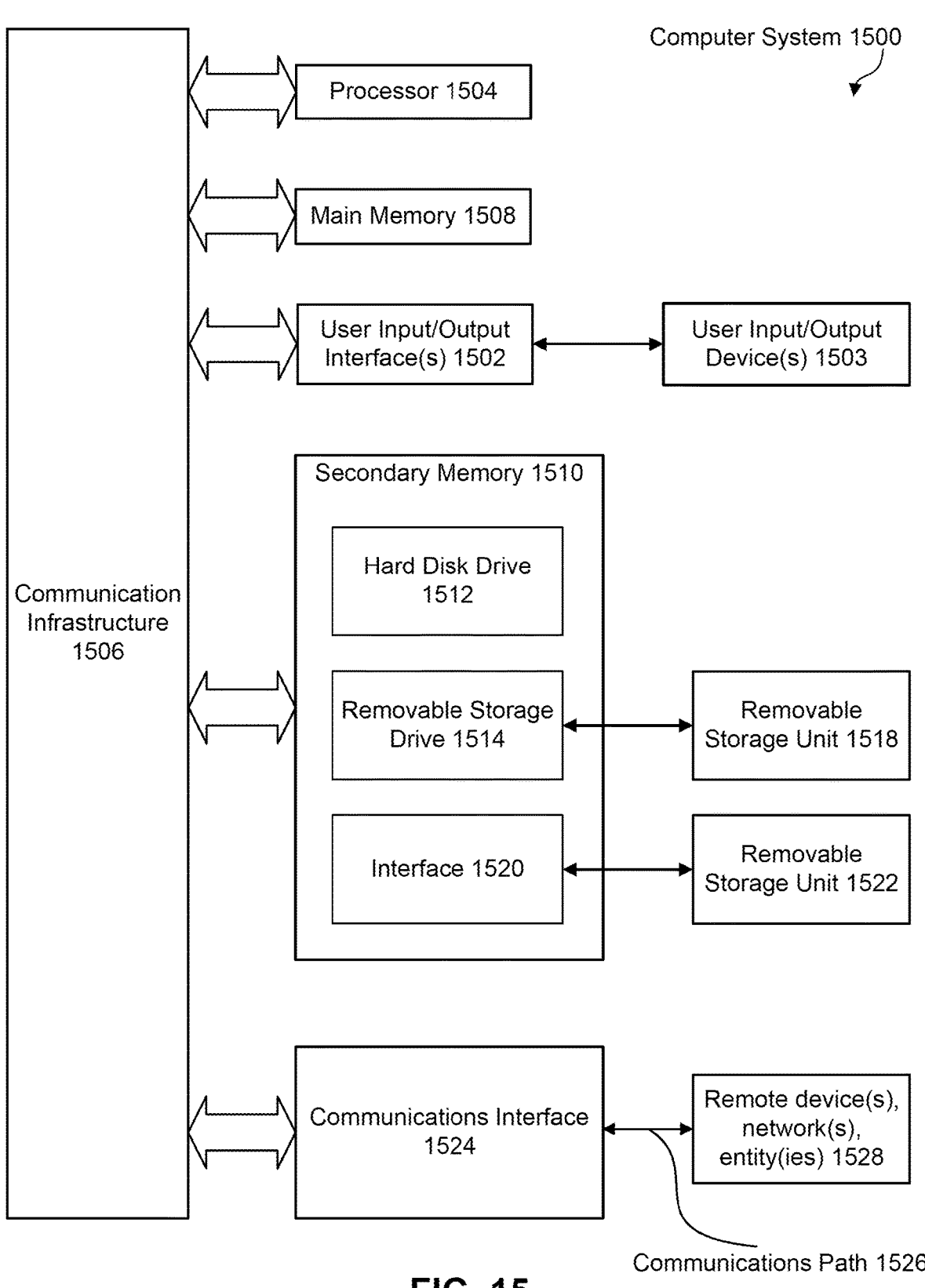
FIG. 15 is an example computer system for implementing some embodiments or portion(s) thereof.

Various embodiments can be implemented, for example, using one or more well-known computer systems, such as computer system 1500 shown in FIG. 15. Computer system 1500 can be any well-known computer capable of performing the functions described herein. For example, and without limitation, initiator devices 120, responder devices 110 of FIGS. 1A-1C, system 200 of FIG. 2, examples 300, 400, 450, 500, 530, 600, 700, 800, 900, 1000, 1100, 1150, 1200, 1290, 1300, 1600, 1650 of FIGS. 3, 4A, 4B, 5A, 5B, 6-10, 11A, 11B, 12A, 12B, 13, 16A, and 16B, and methods 1700, 1800, 1900, 2000, and 2100 of FIGS. 19-21, (and/or other apparatuses and/or components shown in the figures) may be implemented using computer system 1500, or portions thereof.

Computer system 1500 includes one or more processors (also called central processing units, or CPUs), such as a processor 1504. Processor 1504 is connected to a communication infrastructure 1506 that can be a bus. One or more processors 1504 may each be a graphics processing unit (GPU). In an embodiment, a GPU is a processor that is a specialized electronic circuit designed to process mathematically intensive applications. The GPU may have a parallel structure that is efficient for parallel processing of large blocks of data, such as mathematically intensive data common to computer graphics applications, images, videos, etc.

Computer system 1500 also includes user input/output device(s) 1503, such as monitors, keyboards, pointing devices, etc., that communicate with communication infrastructure 1506 through user input/output interface(s) 1502. Computer system 1500 also includes a main or primary memory 1508, such as random access memory (RAM). Main memory 1508 may include one or more levels of cache. Main memory 1508 has stored therein control logic (e.g., computer software) and/or data.

Computer system 1500 may also include one or more secondary storage devices or memory 1510. Secondary memory 1510 may include, for example, a hard disk drive 1512 and/or a removable storage device or drive 1514. Removable storage drive 1514 may be a floppy disk drive, a magnetic tape drive, a compact disk drive, an optical storage device, tape backup device, and/or any other storage device/drive.

Removable storage drive 1514 may interact with a removable storage unit 1518. Removable storage unit 1518 includes a computer usable or readable storage device having stored thereon computer software (control logic) and/or data. Removable storage unit 1518 may be a floppy disk, magnetic tape, compact disk, DVD, optical storage disk, and/any other computer data storage device. Removable storage drive 1514 reads from and/or writes to removable storage unit 1518 in a well-known manner.

According to some embodiments, secondary memory 1510 may include other means, instrumentalities or other approaches for allowing computer programs and/or other instructions and/or data to be accessed by computer system 1500. Such means, instrumentalities or other approaches may include, for example, a removable storage unit 1522 and an interface 1520. Examples of the removable storage unit 1522 and the interface 1520 may include a program cartridge and cartridge interface (such as that found in video game devices), a removable memory chip (such as an EPROM or PROM) and associated socket, a memory stick and USB port, a memory card and associated memory card slot, and/or any other removable storage unit and associated interface.

Computer system 1500 may further include a communication or network interface 1524. Communication interface 1524 enables computer system 1500 to communicate and interact with any combination of remote devices, remote networks, remote entities, etc. (individually and collectively referenced by reference number 1528). For example, communication interface 1524 may allow computer system 1500 to communicate with remote devices 1528 over communications path 1526, which may be wired and/or wireless, and which may include any combination of LANs, WANs, the Internet, etc. Control logic and/or data may be transmitted to and from computer system 1500 via communication path 1526.

The operations in the preceding embodiments can be implemented in a wide variety of configurations and architectures. Therefore, some or all of the operations in the preceding embodiments may be performed in hardware, in software or both. In some embodiments, a tangible, non-transitory apparatus or article of manufacture includes a tangible, non-transitory computer useable or readable medium having control logic (software) stored thereon is also referred to herein as a computer program product or program storage device. This includes, but is not limited to, computer system 1500, main memory 1508, secondary memory 1510 and removable storage units 1518 and 1522, as well as tangible articles of manufacture embodying any combination of the foregoing. Such control logic, when executed by one or more data processing devices (such as computer system 1500), causes such data processing devices to operate as described herein.

Based on the teachings contained in this disclosure, it will be apparent to persons skilled in the relevant art(s) how to make and use embodiments of the disclosure using data processing devices, computer systems and/or computer architectures other than that shown in FIG. 15. In particular, embodiments may operate with software, hardware, and/or operating system implementations other than those described herein.

It is to be appreciated that the Detailed Description section, and not the Summary and Abstract sections, is intended to be used to interpret the claims. The Summary and Abstract sections may set forth one or more but not all exemplary embodiments of the disclosure as contemplated by the inventor(s), and thus, are not intended to limit the disclosure or the appended claims in any way.

While the disclosure has been described herein with reference to exemplary embodiments for exemplary fields and applications, it should be understood that the disclosure is not limited thereto. Other embodiments and modifications thereto are possible, and are within the scope and spirit of the disclosure. For example, and without limiting the generality of this paragraph, embodiments are not limited to the software, hardware, firmware, and/or entities illustrated in the figures and/or described herein. Further, embodiments (whether or not explicitly described herein) have significant utility to fields and applications beyond the examples described herein.

Embodiments have been described herein with the aid of functional building blocks illustrating the implementation of specified functions and relationships thereof. The boundaries of these functional building blocks have been arbitrarily defined herein for the convenience of the description. Alternate boundaries can be defined as long as the specified functions and relationships (or equivalents thereof) are appropriately performed. In addition, alternative embodiments may perform functional blocks, steps, operations, methods, etc. using orderings different from those described herein.

References herein to "one embodiment," "an embodiment," "an example embodiment," or similar phrases, indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it would be within the knowledge of persons skilled in the relevant art(s) to incorporate such feature, structure, or characteristic into other embodiments whether or not explicitly mentioned or described herein.

The breadth and scope of the disclosure should not be limited by any of the above-described exemplary embodiments, but should be defined only in accordance with the following claims and their equivalents.

The present disclosure contemplates that the entities responsible for the collection, analysis, disclosure, transfer, storage, or other use of such personal information data will comply with well-established privacy policies and/or privacy practices. In particular, such entities should implement and consistently use privacy policies and practices that are generally recognized as meeting or exceeding industry or governmental requirements for maintaining personal information data private and secure. Such policies should be easily accessible by users, and should be updated as the collection and/or use of data changes. Personal information from users should be collected for legitimate and reasonable uses of the entity and not shared or sold outside of those legitimate uses. Further, such collection/sharing should only occur after receiving the informed consent of the users. Additionally, such entities should consider taking any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices. In addition, policies and practices should be adapted for the particular types of personal information data being collected and/or accessed and adapted to applicable laws and standards, including jurisdiction-specific considerations. For instance, in the US, collection of, or access to, certain health data may be governed by federal and/or state laws, such as the Health Insurance Portability and Accountability Act (HIPAA); whereas health data in other countries may be subject to other regulations and policies and should be handled accordingly. Hence different privacy practices should be maintained for different personal data types in each country.

What is claimed is:

1. An initiator device comprising:
a memory; and
a processor coupled to the memory, configured to:
transmit, via narrowband signaling in a first access slot of a ranging cycle, a control/initialization poll message that identifies the ranging cycle;
transmit, in the first access slot, a first set of multi-millisecond (MMS) segments corresponding to the control/initialization poll message;
transmit, via narrowband signaling in a second access slot of the ranging cycle, a poll message;
transmit, in the second access slot, a second set of MMS segments corresponding to the poll message;
receive, via narrowband signaling after the first and the second access slots, a first responder report frame corresponding to the first set of MMS segments and a second responder report frame corresponding to the second set of MMS segments; and
transmit, via narrowband signaling within the ranging cycle, a ranging results report message based at least on the first responder report frame and the second responder report frame.

2. The initiator device of claim 1, wherein the control/initialization poll message further comprises: identities of a first responder device and a second responder device and corresponding first and second access slot configurations.

3. The initiator device of claim 2, wherein the corresponding first and second access slot configurations have different lengths.

4. The initiator device of claim 1, wherein the control/initiation poll message comprises: a plurality of access slots including the first and the second access slots, and corresponding durations.

5. The initiator device of claim 1, wherein the processor is further configured to:
receive a poll response message in response to the control/initialization poll message prior to transmitting the poll message; and receive a third MMS segment corresponding to the poll response message prior to transmitting the second set of MMS segments.

6. The initiator device of claim 5, wherein the processor is further configured to: receive from a first responder device, in the first access slot, a third set of MMS segments including the third MMS segment, wherein the third set of MMS segments are interleaved with the first set of MMS segments.

7. The initiator device of claim 1, wherein a number of MMS segments of the first set of MMS segments received from a first responder device is different from a number of MMS segments of the second set of MMS segments received from a second responder device.

8. The initiator device of claim 1, wherein the first responder report frame comprises a MAC address of a first responder device as well as timestamps corresponding to received MMS segments of the first set of MMS segments.

9. A method for a first initiator device, comprising:
receiving a narrowband (NB) advertisement control message from a second initiator device comprising a mini-slot reuse bitmap corresponding to a ranging cycle;
selecting a transmission mini-slot and a corresponding reception mini-slot in the mini-slot reuse bitmap;
transmitting a first multi-millisecond (MMS) segment in the transmission mini-slot;
receiving a second MMS segment in the reception mini-slot from a first responder device related to the first initiator device; and
performing ranging with the first responder device based at least on the first and the second MMS segments.

10. The method for the first initiator device of claim 9, wherein the first initiator device and the second initiator device utilize a same NB channel, the method further comprises:
transmitting a first NB poll message subsequent to an NB poll message transmitted by the second initiator device.

11. The method for the first initiator device of claim 10, wherein a number of MMS segment exchanges of the first initiator device is less than a maximum number of MMS segment exchanges of the second initiator device.

12. The method of the first initiator device of claim 9, wherein an orthogonal hopping sequence is employed in the ranging cycle, the method further comprises:
transmitting a first NB poll message of the first initiator device on a different NB channel used by the second initiator device.

13. The method of the first initiator device of claim 12, wherein a number of MMS segment exchanges of the first initiator device is independent of a maximum number of MMS segment exchanges of the second initiator device.

14. The method of the first initiator device of claim 12, further comprising:
determining from the NB advertisement control message that the second initiator device utilizes a first NB channel, $c_i$; and
selecting a second NB channel, $c_{i+k}$, for transmitting the first NB poll message.

15. A method for an initiator device comprising:
transmitting, via narrowband signaling in a first access slot of a ranging cycle, a control/initialization poll message that identifies the ranging cycle;
transmitting, in the first access slot, a first set of multi-millisecond (MMS) segments corresponding to the control/initialization poll message;
transmitting, via narrowband signaling in a second access slot of the ranging cycle, a poll message;

transmitting, in the second access slot, a second set of MMS segments corresponding to the poll message;

receiving, via narrowband signaling after the first and the second access slots, a first responder report frame corresponding to the first set of MMS segments and a second responder report frame corresponding to the second set of MMS segments; and transmitting, via narrowband signaling within the ranging cycle, a ranging results report message based at least on the first responder report frame and the second responder report frame.

16. The method of claim 15, wherein the control/initialization poll message further comprises: identities of a first responder device and a second responder device and corresponding first and second access slot configurations.

17. The method of claim 16, wherein the corresponding first and second access slot configurations comprise different lengths.

18. The method of claim 15, wherein the control/initiation poll message comprises: a plurality of access slots including the first and the second access slots, and corresponding durations.

19. The method of claim 15, further comprising:

receiving a poll response message in response to the control/initialization poll message prior to transmitting the poll message; and receiving a third MMS segment corresponding to the poll response message prior to transmitting the second set of MMS segments.

20. The method of claim 15, wherein a number of MMS segments of the first set of MMS segments received from a first responder device is different from a number of MMS segments of the second set of MMS segments received from a second responder device.

* * * * *